US012566870B2

(12) United States Patent
Chong et al.

(10) Patent No.: US 12,566,870 B2
(45) Date of Patent: Mar. 3, 2026

(54) COMMUNICATION METHOD, DEVICE, AND SYSTEM FOR OBTAINING AUTHORIZATION INFORMATION OF USER-RELATED DATA

(71) Applicant: HUAWEI TECHNOLOGIES CO., LTD., Shenzhen (CN)

(72) Inventors: Weiwei Chong, Shenzhen (CN); Yang Xin, Shanghai (CN); Xiaobo Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 464 days.

(21) Appl. No.: 18/164,416

(22) Filed: Feb. 3, 2023

(65) Prior Publication Data

US 2023/0185933 A1 Jun. 15, 2023

Related U.S. Application Data

(63) Continuation of application No. PCT/CN2020/107538, filed on Aug. 6, 2020.

(51) Int. Cl.
*G06F 21/62* (2013.01)
*G06F 21/31* (2013.01)

(52) U.S. Cl.
CPC .............. *G06F 21/62* (2013.01); *G06F 21/31* (2013.01)

(58) Field of Classification Search
None
See application file for complete search history.

(56) References Cited

U.S. PATENT DOCUMENTS 7,076,558 B1 * 7/2006 Dunn .................. G06F 21/6218
726/28
8,793,509 B1 7/2014 Nelson et al.
(Continued)

FOREIGN PATENT DOCUMENTS

CN 101277234 A 10/2008
CN 107506427 A 12/2017
(Continued)

OTHER PUBLICATIONS

Ki#15 Sol#3: Update to User consent for UE data collection, SA WG2 Meeting #139E, S2-2004561, Electronic, Ibonia, Total 3 pages, 3rd Generation Partnership Project, Valbonne, France (Jun. 1-12, 2020). (Year: 2020).*

(Continued)

*Primary Examiner* — Sanchit K Sarker
(74) *Attorney, Agent, or Firm* — Leydig, Voit & Mayer, Ltd.

(57) ABSTRACT

Embodiments of this application disclose a communication method, device, and system. A first network element sends a first request to a second network element, where the first request is for requesting authorization information of user-related data, the first request includes user information and a first use scope of the user-related data, and the first use scope includes at least one of the following information: a first use object, a first use purpose, or first use time. The first network element receives a first response sent by the second network element, where the first response includes authorization information, and the authorization information indicates whether a user corresponding to the user information allows the related data to be used for the first use scope.

20 Claims, 6 Drawing Sheets

(56) References Cited

U.S. PATENT DOCUMENTS

| | | | |
|---|---|---|---|
| 10,733,685 | B1 | 8/2020 | Gailloux et al. |
| 2018/0270778 | A1 | 9/2018 | Bharatia |
| 2020/0242233 | A1* | 7/2020 | Konoura ......... G06Q 10/06315 |
| 2021/0392522 | A1* | 12/2021 | Wang ................. H04L 41/0668 |
| 2024/0119164 | A1* | 4/2024 | Dave .................... G06F 21/604 |

FOREIGN PATENT DOCUMENTS

| | | |
|---|---|---|
| CN | 109511115 A | 3/2019 |
| CN | 110830422 A | 2/2020 |
| WO | 2020066890 A1 | 4/2020 |

OTHER PUBLICATIONS

"3rd Generation Partnership Project; Technical Specification Group Services and System Aspects; Architecture enhancements for 5G System (5GS) to support network data analytics services (Release 16)," 3GPP TS 23.288 V16.4.0, pp. 1-66, 3rd Generation Partnership Project, Valbonne, France (Jul. 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440, 3rd Generation Partnership Project, Valbonne, France (Aug. 2020).

"3rd Generation Partnership Project; Technical Specification Group Services and System Aspects; Procedures for the 5G System (5GS); Stage 2 (Release 16)," 3GPP TS 23.502 V16.5.0, pp. 1-594, 3rd Generation Partnership Project, Valbonne, France (Jul. 2020).

"Key issue on user consent of data collection and data analytic," SA WG2 Meeting #135, S2-1909288, Split, Croatia, Total 2 pages, 3rd Generation Partnership Project, Valbonne, France (Oct. 14-18, 2019).

"Key issue on user's consent of data collection and data analytic," SA WG2 Meeting #136, S2-1911192, Reno, NV, USA, Total 2 pages, 3rd Generation Partnership Project, Valbonne, France (Nov. 18-22, 2019).

"New Key Issue: User consent for analytics collection from the UEs," SA WG2 Meeting #136, S2-1911351, Reno, Nevada, US, Total 1 page, 3rd Generation Partnership Project, Valbonne, France (Nov. 18-22, 2019).

"Solution KI#X—User consent for UE analytics collection," SA WG2 Meeting #136, S2-1911354, Reno, Nevada, US, Total 2 pages, 3rd Generation Partnership Project, Valbonne, France (Nov. 18-22, 2019).

"Solution KI#X—User consent for UE analytics collection," SA WG2 Meeting #136-AH, S2-2000315, Incheon, South Korea, Total 2 pages, 3rd Generation Partnership Project, Valbonne, France (Jan. 13-17, 2020).

"Solution KI#X—User consent for UE analytics collection," SA WG2 Meeting #136-AH, S2-2001211, Incheon, South Korea, Total 2 pages, 3rd Generation Partnership Project, Valbonne, France (Jan. 13-17, 2020).

"Solution KI#X—User consent for UE analytics collection," SA WG2 Meeting #136-AH, S2-2001260, Incheon, South Korea, Total 2 pages, 3rd Generation Partnership Project, Valbonne, France (Jan. 13-17, 2020).

"Solution KI#X—User consent for UE analytics collection," SA WG2 Meeting #136-AH, S2-2001309, Incheon, South Korea, Total 2 pages, 3rd Generation Partnership Project, Valbonne, France (Jan. 13-17, 2020).

"Solution KI#X—User consent for UE analytics collection," SA WG2 Meeting #136-AH, S2-2001697, Incheon, South Korea, Total 2 pages, 3rd Generation Partnership Project, Valbonne, France (Jan. 13-17, 2020).

"KI #15, Solution #3: updates to call flow," SA WG2 Meeting #139E, S2-2003671, Elbonia, Total 2 pages, 3rd Generation Partnership Project, Valbonne, France (Jun. 1-12, 2020).

"KI#15 Sol#3: Update to User consent for UE data collection," SA WG2 Meeting #139E, S2-2003762, Electronic, Elbonia, Total 3 pages, 3rd Generation Partnership Project, Valbonne, France (Jun. 1-12, 2020).

"KI#15 Sol#3: Update to User consent for UE data collection," SA WG2 Meeting #139E, S2-2004561, Electronic, Elbonia, Total 3 pages, 3rd Generation Partnership Project, Valbonne, France (Jun. 1-12, 2020).

"3rd Generation Partnership Project; Technical Specification Group Services and System Aspects; System architecture for the 5G System (5GS); Stage 2 (Release 15)," 3GPP TS 23.501 V15.10.0, pp. 1-249, 3rd Generation Partnership Project, Valbonne, France (Jul. 2020).

* cited by examiner

COMMUNICATION METHOD, DEVICE, AND SYSTEM FOR OBTAINING AUTHORIZATION INFORMATION OF USER-RELATED DATA

CROSS-REFERENCE TO RELATED APPLICATIONS

This application is a continuation of International Application No. PCT/CN2020/107538, filed on Aug. 6, 2020, the disclosure of which is hereby incorporated by reference in its entirety.

TECHNICAL FIELD

This application relates to the field of communication technologies, and in particular, to a communication method, device, and system.

BACKGROUND

In the current technology, user-based data generated by a user in a communication operator network belongs to the user, and the operator network is prohibited from obtaining or using the user-based data at will.

In an actual application, there are some scenarios in which the communication operator network needs to obtain and use the user-based data, to perform data analysis and the like based on the obtained user-based data. However, in the current technology, the communication operator network does not provide a solution for precisely obtaining authorization information of user-related data.

SUMMARY

In view of this, embodiments of this application provide a communication method, device, and system, through which authorization information of user-related data is precisely obtained.

To resolve the foregoing problem, embodiments of this application provide the following technical solutions.

According to a first aspect, an embodiment of this application provides a communication method, the method including: a first network element sends a first request to a second network element. The first request is for requesting authorization information of user-related data, the first request includes user information and a first use scope of the user-related data, and the first use scope includes at least one of the following information: a first use object, a first use purpose, and first use time. The first network element receives a first response sent by the second network element. The first response includes authorization information, and the authorization information indicates whether a user corresponding to the user information allows the related data to be used for the first use scope. In this implementation, the user information indicates a user or some users, and the user information may be an identifier of an area in which the user is located, an identifier of the user, an identifier of a user group to which the user belongs, an identifier of a network slice corresponding to the user, a data network name DNN of the user, and an identifier of a network element to which the user belongs. When intending to obtain user-related data of a user corresponding to the user information, the first network element may first send the first request to the second network element, to obtain authorization information of the user through the second network element, so that when the authorization information indicates that the user corresponding to the user information allows the user-related data to be used for the first use scope, the first network element obtains the user-related data, so that the first network element may perform a related operation based on user-based data. In this implementation, the first network element may precisely obtain the authorization information corresponding to the user-related data by sending the first request to the second network element, thereby implementing precise obtaining.

In a possible implementation, the user-related data includes first data and/or second data related to the user, the first data includes data corresponding to the user generated by at least one of a terminal device, an application server, or a network device, and the second data includes a data analysis result obtained by performing data analysis based on the first data. The first data may be classified into raw data and processed data. The raw data may include raw data corresponding to a user generated by at least one of a terminal device, an application server, or a network device. The processed data includes data processed based on the raw data. Specifically, operations such as aggregation and anonymization may be performed on the raw data. In this implementation, the user-based data is divided to obtain a plurality of types of data, to set different authorization information for each type of data, thereby protecting the user-related data more comprehensively.

In a possible implementation, the first request further includes a first type identifier, and the first type identifier is for identifying a type of the user-related data. That is, the first type identifier is for identifying that the first data and/or the second data in the user-related data need to be obtained. In this implementation, when requesting the authorization information from the second network element, the first network element requests authorization information of user-related data corresponding to the first type identifier. Specifically, when the first type identifier is an event identifier, it indicates that authorization information of the first data is requested; or when the first type identifier is an analytics identifier, it indicates that authorization information of the second data is requested.

In a possible implementation, when the user-related data is the first data, the first type identifier is the event identifier, and the first data is data related to an event corresponding to the event identifier.

In a possible implementation, when the user-related data is the second data, the first type identifier is the analytics identifier, and the second data is a data analysis result corresponding to the analytics identifier.

In a possible implementation, when the first network element is a network data analytics function NWDAF network element, the second network element is a unified data management UDM network element, a user data repository UDR network element, an authentication service function AUSF network element, or a terminal device.

In a possible implementation, when the user-related data is the first data, the first use purpose may include performing data analysis, that is, the first use purpose indicates that data analysis is performed on the first data to obtain the data analysis result. In this implementation, a purpose of obtaining the first data may be indicated by the first use purpose, to obtain authorization information of the user for the use purpose.

In a possible implementation, when the user-related data is the first data, the first use scope may further include an analytics identifier, and the analytics identifier is for indicating to perform data analysis on the first data to obtain a data analysis result corresponding to the analytics identifier.

In this implementation, a specific type of analysis performed on the first data may be specifically indicated by the analytics identifier.

In a possible implementation, when the user-related data is the first data, the first use purpose may be obtaining the data analysis result or opening to a third-party AF for use, or which data analysis result to be specifically obtained may be further defined, for example, a movement track analysis result of the user is obtained.

In a possible implementation, the first request further includes a second use scope corresponding to the data analysis result, and the second use scope includes at least one of the following information: a second use object, a second use purpose, and second use time. In this implementation, when the data analysis result obtained by performing data analysis on the first data is obtained, a use scope of the data analysis result may be further set. For example, the second use object is for indicating an object for which the data analysis result is to be used, the second use purpose is for indicating a purpose for which the data analysis result is to be used, and the second use time is for indicating a time for which the data analysis result is to be used. Authorization information of a user including the second use scope is obtained by further setting the second use scope.

In a possible implementation, the first network element is a network exposure function NEF network element, and the second network element is a unified data management UDM network element, a user data repository UDR network element, an authentication service function AUSF network element, or a terminal device. In this implementation, when the first network element is the NEF network element, the first network element may send the first request to any one of the UDM network element, the UDR network element, the AUSF network element, or the terminal device, to request to obtain the authorization information of the user.

In a possible implementation, the first use object is an application server AF. In this implementation, when the first network element is the NEF network element, a use object of user-related data requested by the first network element may be the AF.

In a possible implementation, when the first network element is an access and mobility management function AMF network element, the second network element is a unified data management UDM network element, a user data repository UDR network element, an authentication service function AUSF network element, or a terminal device.

In a possible implementation, a condition for the first network element to send the first request to the second network element may be triggered by a requirement of the first network element, or may be a case that the first network element receives a second request sent by a third network element, where the second request is for requesting to obtain the user-related data. The first network element sends the first request to the second network element based on the second request. In this implementation, when receiving the second request sent by the third network element, the first network element sends the first request to the second network element to request the authorization information of the user.

In a possible implementation, the second request may include user information and a third use scope, where the user information is for identifying a user, and the user information may be an identifier of an area in which the user is located, an identifier of the user, an identifier of a user group to which the user belongs, an identifier of a network slice corresponding to the user, a data network name DNN of the user, and an identifier of a network element to which the user belongs. The third use scope includes at least one of the following information: a third use object, a third use purpose, and third use time. The third use object is for indicating a use object of user-related data requested by the second request, the third use purpose is for indicating a use purpose of the user-related data requested by the second request, and the third use time is for indicating use time of the user-related data requested by the second request.

In a possible implementation, the second request may further include a second type identifier, and the second type identifier is for identifying a type of user-related data requested by the third network element. The second type identifier may be an event identifier or an analytics identifier. In this case, the first network element may determine the first type identifier based on the second type identifier. In this implementation, when the second request includes the second type identifier, the first network element may determine the first type identifier in the first request based on the second type identifier, to present the first type identifier in the first request.

In a possible implementation, that the first network element determines the first type identifier based on the second type identifier may include: the first network element determines a second data type identifier as the first type identifier.

In a possible implementation, that the first network element determines the first type identifier based on the second type identifier may include: the first network element determines the first type identifier based on configuration information and a second data type identifier. The configuration information indicates a correspondence between the first type identifier and the second data type identifier. In this implementation, the first network element maps the second type identifier to the first type identifier based on the configuration information, to include the first type identifier in the first request.

In a possible implementation, when the authorization information indicates that a user corresponding to the user information allows the user-related data to be used for the first use scope, the method further includes: the first network element sends a second response to the third network element, where the second response includes the user-related data requested by the third network element.

In a possible implementation, the third network element is an application server AF, a network function NF network element, a network management system network element, or a terminal device.

In a possible implementation, when the first network element is an application function AF network element, the second network element may be a network exposure function NEF network element.

In a possible implementation, the method further includes: when the authorization information indicates that a user corresponding to the user information allows the user-related data to be used for the first use scope, the first network element obtains the user-related data. When the user allows the user-related data to be used, the first network element obtains the user-related data, which avoids misuse of the user-related data and improves security of the user-related data.

In a possible implementation, the method further includes: when the authorization information indicates that a user corresponding to the user information does not allow the user-related data to be used for the first use scope, the first network element deletes the user-related data or stops obtaining the user-related data. In this implementation, when the user does not allow the user-related data to be used, if the first network element has obtained the user-related data, the first network element deletes the user-related data; or if the first network element has not obtained the user-related data, the first network element stops obtaining the user-related data, thereby ensuring security of the user-related data.

In a possible implementation, when the authorization information indicates that a user corresponding to user information does not allow the user-related data to be used for the first use scope, the first response further includes cause information used for indicating why the user-related data is not allowed to be used. In this implementation, when the user does not allow the user-related data to be used, the first response may further include the cause information indicating why the user-related data is not allowed to be used, to notify a specific cause why the user-related data is not allowed to be used.

According to a second aspect, an embodiment of this application provides a communication method, the method including: a second network element receives a first request sent by a first network element, the first request is for requesting authorization information of user-related data, the first request includes user information and a first use scope of the user-related data, and the first use scope includes at least one of the following information: a first use object, a first use purpose, and first use time; the second network element determines the authorization information based on the first request; and the second network element sends a first response to the first network element, the first response includes the authorization information, and the authorization information indicates whether a user corresponding to the user information allows the user-related data to be used for the first use scope.

In a possible implementation, that the second network element determines the authorization information based on the first request includes: the first network element determines the authorization information corresponding to the user information based on whether the first request matches stored authorization information of a network user. In this implementation, the second network element may pre-store authorization information of a user in a network. When receiving the first request sent by the first network element, the second network element determines the authorization information corresponding to the user information based on whether user information in the first request matches the authorization information of the user.

In a possible implementation, that the second network element determines the authorization information based on the first request includes: the second network element sends a third request to a terminal device corresponding to the user information based on the first request, where the third request is for requesting the authorization information corresponding to the user information from the terminal device; and the second network element receives a third response sent by the terminal device, where the third response includes the authorization information corresponding to the user information. In this implementation, the second network element obtains the authorization information corresponding to the user information by sending the third request to the terminal device.

In a possible implementation, that the second network element determines the authorization information based on the first request includes: the second network element initiates a fourth request to a fourth network element based on the first request, where the fourth request is for requesting, from the fourth network element, the authorization information corresponding to the user information; and the second network element receives a fourth response sent by the fourth network element, where the fourth response includes the authorization information corresponding to the user information. In this implementation, the second network element obtains the authorization information corresponding to the user information by sending the fourth request to the fourth network element.

In a possible implementation, the user-related data includes first data and/or second data related to the user, the first data includes data corresponding to the user generated by at least one of a terminal device, an application server, or a network device, and the second data includes a data analysis result obtained by performing data analysis based on the first data.

In a possible implementation, the first request further includes a first type identifier, and the first type identifier is for indicating a type of the user-related data; and that the first request is for requesting authorization information of user-related data includes: the first request is for requesting authorization information of user-related data corresponding to the first type identifier.

In a possible implementation, the first network element is a network data analytics function NWDAF network element, and the second network element is a unified data management UDM network element, a user data repository UDR network element, an authentication service function AUSF network element, or a terminal device.

In a possible implementation, when the user-related data is the first data, the first use object is the network data analytics function NWDAF network element.

In a possible implementation, when the user-related data is the first data, the first use purpose includes performing data analysis.

In a possible implementation, when the user-related data is the first data, the first use scope further includes an analytics identifier, and the analytics identifier is for indicating to perform data analysis on the first data to obtain a data analysis result corresponding to the analytics identifier.

In a possible implementation, the first request further includes a second use scope corresponding to the data analysis result, and the second use scope includes at least one of the following information: a second use object, a second use purpose, and second use time.

In a possible implementation, when the user data is the second data, the first type identifier is the analytics identifier.

In a possible implementation, the first network element is a network exposure function NEF network element, and the second network element is a unified data management UDM network element, a user data repository UDR network element, an authentication service function AUSF network element, or a terminal device.

In a possible implementation, the first use object is an application server AF.

In a possible implementation, the first network element is an access and mobility management function AMF network element, and the second network element is a unified data management UDM network element, a user data repository UDR network element, an authentication service function AUSF network element, or a terminal device.

In a possible implementation, when the authorization information indicates that a user corresponding to user information does not allow the user-related data to be used for the first use scope, the first response further includes cause information indicating why the user-related data is not allowed to be used.

According to a third aspect, an embodiment of this application provides a communication method, the method including: a third network element sends a second request to a first network element. The second request is for requesting to obtain user-related data, and includes user information and a third use scope. The third use scope includes at least one of the following information: a third use object, a third use purpose, and third use time. The third network element receives a second response sent by the first network element. The second response includes the user-related data or indication information, and the indication information indicates that the user-related data fails to be obtained.

In a possible implementation, the user-related data includes first data and/or second data related to the user, the first data includes data corresponding to the user generated by at least one of a terminal device, an application server, or a network device, and the second data includes a data analysis result obtained by performing data analysis based on the first data.

In a possible implementation, when the second response includes the indication information, the second response further includes failure cause information, to notify the third network element of a specific failure cause through the failure cause information.

In a possible implementation, the second request further includes a second type identifier, and the second type identifier is for identifying a type of user-related data that the third network element requests to obtain. In this implementation, the second type identifier is for identifying first data or second data in the user-related data. When the user-related data requested by the third network element is the first data, the second type identifier is an event identifier. When the user-related data requested by the third network element is the second data, the second type identifier is an analytics identifier.

In a possible implementation, the third network element may be an application server AF or a network function NF network element.

According to a fourth aspect, an embodiment of this application provides a communication method, the method including: a terminal device receives a third request sent by a second network element. The third request is for requesting authorization information of user-related data, the third request includes a first use scope of the user-related data, and the first use scope includes at least one of the following information: a first use object, a first use purpose, and first use time. The terminal device determines authorization information based on the third request, and sends a third response to the second network element. The third response includes the authorization information.

In a possible implementation, the user-related data includes first data and/or second data related to the user, the first data includes data corresponding to the user generated by at least one of a terminal device, an application server, or a network device, and the second data includes a data analysis result obtained by performing data analysis based on the first data.

According to a fifth aspect, a communication device is provided, including:

a sending unit, configured to send a first request to a second network element, where the first request is for requesting authorization information of user-related data, the first request includes user information and a first use scope of the user-related data, and the first use scope includes at least one of the following information: a first use object, a first use purpose, and first use time; and a receiving unit, configured to receive a first response sent by the second network element, where the first response includes the authorization information, and the authorization information indicates whether a user corresponding to the user information allows the user-related data to be used for the first use scope.

In a possible implementation, the user-related data includes first data and/or second data related to the user, the first data includes data corresponding to the user generated by at least one of a terminal device, an application server, or a network device, and the second data includes a data analysis result obtained by performing data analysis based on the first data.

In a possible implementation, the first request further includes a first type identifier, and the first type identifier is for identifying a type of the user-related data; and that the first request is for requesting authorization information of user-related data includes:

the first request is for requesting authorization information of user-related data corresponding to the first type identifier.

In a possible implementation, when the user-related data is the first data, the first type identifier is an event identifier, and the first data is data of related to an event corresponding to the event identifier.

In a possible implementation, the first network element is a network data analytics function NWDAF network element, and the second network element is a unified data management UDM network element, a unified user data repository UDR network element, an authentication service function AUSF network element, or a terminal device.

In a possible implementation, when the user-related data is the first data, the first use object is the network data analytics function NWDAF network element.

In a possible implementation, when the user-related data is the first data, the first use purpose includes performing data analysis.

In a possible implementation, when the user-related data is the first data, the first use scope further includes an analytics identifier, and the analytics identifier is for indicating to perform data analysis on the first data to obtain a data analysis result corresponding to the analytics identifier.

In a possible implementation, the first request further includes a second use scope corresponding to the data analysis result, and the second use scope includes at least one of the following information: a second use object, a second use purpose, and second use time.

In a possible implementation, when the user-related data is the second data, the first type identifier is an analytics identifier, and the second data is a data analysis result corresponding to the analytics identifier.

In a possible implementation, the communication device is a network exposure function NEF network element, and the second network element is a unified data management UDM network element, a unified user data repository UDR network element, an authentication service function AUSF network element, or a terminal device.

In a possible implementation, the first use object is an application server AF.

In a possible implementation, when the communication device is an access and mobility management function AMF network element, the second network element is a unified data management UDM network element, a unified user data repository UDR network element, an authentication service function AUSF network element, or a terminal device.

In a possible implementation, the receiving unit is further configured to receive a second request sent by a third network element. The second request is for requesting to obtain user-related data.

The sending unit is specifically configured to send the first request to the second network element based on the second request.

In a possible implementation, the second request includes user information and a third use scope, and the third use scope includes at least one of the following information: a third use object, a third use purpose, and third use time. The device further includes:

a processing unit, configured to obtain the first use scope based on the third use scope.

In a possible implementation, the second request includes a second type identifier, and the second type identifier is for identifying a type of the user-related data requested by the third network element.

The processing unit is further configured to determine a first type identifier based on the second type identifier.

In a possible implementation, the processing unit is specifically configured to determine a second data type identifier as the first type identifier.

In a possible implementation, the processing unit is specifically configured to determine the first type identifier based on configuration information and a second data type identifier, where the configuration information indicates a correspondence between the first type identifier and the second data type identifier.

In a possible implementation, the third network element is an application server AF or a network function NF network element.

According to a sixth aspect, a communication device is provided, including:

a receiving unit, configured to receive a first request sent by a first network element, where the first request is for requesting authorization information of user-related data, the first request includes user information and a first use scope of the user-related data, and the first use scope includes at least one of the following information: a first use object, a first use purpose, and first use time;

a processing unit, configured to determine the authorization information based on the first request; and a sending unit, further configured to send a first response to the first network element, where the first response includes the authorization information, and the authorization information indicates whether a user corresponding to the user information allows the user-related data to be used for the first use scope.

In a possible implementation, the processing unit is specifically configured to determine the authorization information corresponding to the user information based on whether the first request matches stored authorization information of a network user.

In a possible implementation, the processing unit is specifically configured to initiate a third request to the terminal device corresponding to the user information based on the first request through a transceiver. The third request is for requesting the authorization information corresponding to the user information from a terminal device, and receive a third response sent by the terminal device through the transceiver. The third response includes the authorization information corresponding to the user information.

In a possible implementation, the processing unit is specifically configured to initiate a fourth request to a fourth network element based on the first request through the transceiver. The fourth request is for requesting the authorization information corresponding to the user information from the fourth network element, and receive a fourth response sent by the fourth network element through the transceiver. The fourth response includes the authorization information corresponding to the user information.

In a possible implementation, the user-related data includes first data and/or second data related to the user, the first data includes data corresponding to the user generated by at least one of a terminal device, an application server, or a network device, and the second data includes a data analysis result obtained by performing data analysis based on the first data.

In a possible implementation, the first request further includes a first type identifier, and the first type identifier is for indicating a type of the user-related data; and that the first request is for requesting authorization information of user-related data includes:

the first request is for requesting authorization information of user-related data corresponding to the first type identifier.

In a possible implementation, the first network element is a network data analytics function NWDAF network element, and the communication device is a unified data management UDM network element, a user data repository UDR network element, an authentication service function AUSF network element, or a terminal device.

In a possible implementation, when the user-related data is the first data, the first use object is the network data analytics function NWDAF network element.

In a possible implementation, when the user-related data is the first data, the first use purpose includes performing data analysis.

In a possible implementation, when the user-related data is the first data, the first use scope further includes an analytics identifier, and the analytics identifier is for indicating to perform data analysis on the first data to obtain a data analysis result corresponding to the analytics identifier.

In a possible implementation, the first request further includes a second use scope corresponding to the data analysis result, and the second use scope includes at least one of the following information: a second use object, a second use purpose, and second use time.

In a possible implementation, when the user data is the second data, the first type identifier is the analytics identifier.

In a possible implementation, the first network element is a network exposure function NEF network element, and the communication device is a unified data management UDM network element, a user data repository UDR network element, an authentication service function AUSF network element, or a terminal device.

In a possible implementation, the first use object is an application server AF.

In a possible implementation, the first network element is an access and mobility management function AMF network element, and the communication device is a unified data management UDM network element, a user data repository UDR network element, an authentication service function AUSF network element, or a terminal device.

According to a seventh aspect, a communication device is provided, including a processor. The processor is coupled to a memory, and may be configured to perform the method according to any one of the first aspect to the fourth aspect, and any one of the possible implementations of the first aspect to the fourth aspect. Optionally, the communication device further includes the memory. Optionally, the communication device further includes a communication interface, and the processor is coupled to the communication interface.

In an implementation, the communication device is a terminal device. When the communication device is a terminal device, the communication interface may be a transceiver or an input/output interface. Optionally, the transceiver may be a transceiver circuit. Optionally, the input/output interface may be an input/output circuit.

In another implementation, the communication device is a network device. When the communication device is the network device, for example, any one or more of the first network element, the second network element, the third network element, and the fourth network element, the communication interface may be a transceiver or an input/output interface. Optionally, the transceiver may be a transceiver circuit. Optionally, the input/output interface may be an input/output circuit.

In another implementation, the communication device is a chip or a chip system. When the communication device is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to an eighth aspect, a system is provided. The system includes the foregoing terminal device and the foregoing network device. The network device in embodiments of this application is a network element on a network side. For example, the first network element, the second network element, the third network element, and the fourth network element may all be referred to as network devices. The network device in embodiments of this application may be any one or more of the first network element, the second network element, the third network element, or the fourth network element.

According to a ninth aspect, a computer program product is provided. The computer program product includes a computer program (which may also be referred to as code or instructions). When the computer program is run, a computer is enabled to perform the method according to any possible implementation of the first aspect, or the computer is enabled to perform the method according to any implementation of the first aspect to the fourth aspect.

According to a tenth aspect, a computer-readable storage medium is provided. The computer-readable storage medium stores a computer program (which may also be referred to as code or instructions). When the computer program is run on a computer, the computer is enabled to perform the method according to any possible implementation of the first aspect, or perform the method according to any implementation of the first aspect to the fourth aspect.

DESCRIPTION OF EMBODIMENTS

In the descriptions of this application, unless otherwise stated, "/" means "or". For example, A/B may mean A or B. A term "and/or" in this specification describes only an association relationship between associated objects and indicates that there may be three relationships. For example, A and/or B may represent the following three cases: only A exists, both A and B exist, and only B exists. In the descriptions of this application, unless otherwise specified, "at least one" means one or more, and "a plurality of" means two or more than two.

In addition, for ease of clearly describing the technical solutions in embodiments of this application, words such as "first" and "second" are used in embodiments of this application to distinguish between same items or similar items that have basically the same functions or purposes. A person skilled in the art may understand that the terms such as "first" and "second" do not limit a quantity or an execution sequence, and the terms such as "first" and "second" do not indicate a definite difference.

The technical solutions in embodiments of this application are applicable to a 4th generation (4G) system, various systems evolved based on the 4G system, a 5th generation (5G) system, and various systems evolved based on the 5G system. The 4G system may also be referred to as an evolved packet system (EPS). In the 4G system, a core network (CN) may be referred to as an evolved packet core (EPC), and an access network may be referred to as long term evolution (LTE). In the 5G system, a core network may be referred to as a 5GC (5G core), and an access network may be referred to as new radio (NR). For ease of description, this application is described below by using an example in which this application is applied to a 5G system. When this application is applied to a 4G system or another communication system, a network element involved in this application is replaced with a network element that has a same or similar function in a corresponding communication system.

Figure 1:
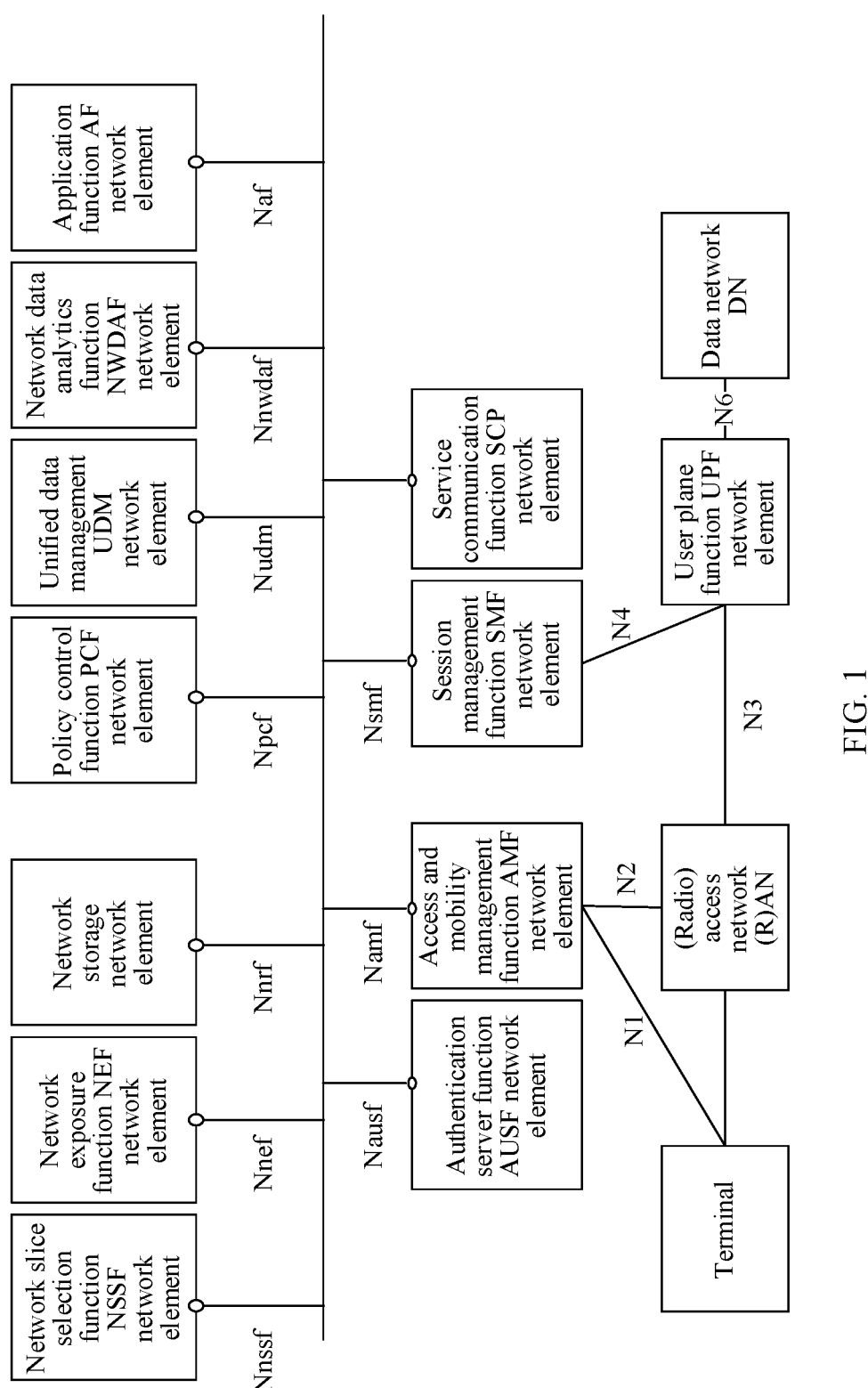
FIG. 1 is a diagram of an architecture of a communication system according to an embodiment of this application.

FIG. 1 shows an example of a schematic diagram of a network architecture of a 5G system based on a service interface. In this schematic diagram, the 5G system may include: an authentication server function (AUSF) network element, an access and mobility management function (AMF) network element, a data network (DN), a unified data management (UDM) network element, a user data repository (UDR) network element, a policy control function (PCF) network element, a (radio) access network ((R) AN) network element, a user plane function (UPF) network element, a terminal, an application function (AF) network element, a session management function (SMF) network element, a binding support function (BSF) network element, a network data analytics function (NWDAF) network element, a network exposure function (NEF) network element, and a network repository function (n NRF) network element.

For ease of description, in the following, the (R)AN network element, the AMF network element, the SMF network element, the UDM network element, the UDR network element, the AUSF network element, the UPF network element, the PCF network element, the BSF network element, the NWDAF network element, the NRF network element, the NEF network element, and the like are respectively represented by using a RAN, an AMF, an SMF, a UDM, a UDR, an AUSF, a UPF, a PCF, a BSF, an NWDAF, an NRF, an NEF, and the like.

The 5G system is divided into an access network and a core network. The access network implements functions related to a radio access, and mainly includes a RAN. The core network is for network service control, data transmission, and the like. The core network includes a plurality of network elements, mainly including an AMF, an SMF, a UPF, a PCF, a UDM, and the like.

Functions of some network elements in FIG. 1 are as follows.

The PCF is configured to provide a policy such as a quality of service (QoS) policy and a slice selection policy for the AMF and the SMF.

The UDM is configured to process authentication and key agreement (AKA), authentication credentials, user identification processing, access authorization, registration/mobility management, subscription management, short message service management, and the like of a 3rd generation partnership project 3GPP). In this application, the UDM may provide a function of storing information about a network element (a serving NF such as a serving AMF, a serving SMF, or a serving NWDAF) that currently serves a terminal.

The UDR, as a logical repository for storing user data, is configured to implement sharing and distribution of user-related data.

The AUSF is configured to provide a user authentication and authorization service for a network.

The AF may be an application server, and may belong to an operator or a third party. The AF mainly supports interacting with a 3GPP core network to provide a service, for example, a service that affects a data routing decision, a policy control function, or some third-party services provided for a network side.

The NEF is configured to provide a customized function of network exposure, and further support an authentication and authorization function for a third-party AF.

The AMF is mainly responsible for signaling processing, for example, functions such as terminal registration management, terminal connection management, terminal reachability management, terminal access authorization and authentication, a terminal security function, terminal mobility management (such as terminal location update, terminal registration with a network, and terminal handover), network slice selection, SMF selection, and terminal registration or deregistration.

The SMF is mainly responsible for all control plane functions of terminal session management, including UPF selection, control, and redirection, internet protocol (IP) address allocation and management, session QoS management, policy and charging control (PCC) policy obtaining from the PCF, bearer or session establishment, modification, and release, and the like.

The UPF, as an anchor of a session connection of a protocol data unit (PDU), is responsible for data packet filtering, data transmission/forwarding, rate control, charging information generation, user plane QoS processing, uplink transmission authentication, transmission level verification, downlink data packet buffering, downlink data notification triggering, and the like of the terminal. The UPF may also serve as a branching point of a multi-homed PDU session. A resource transmission and scheduling function for providing a service for a terminal in the UPF is managed and controlled by the SMF.

The NRF is a network element that stores information such as a network element attribute, a network element status, and a network topology relationship. The NRF has network element discovery and management functions.

The BSF may bind or store a corresponding terminal address, a terminal identifier, a data network name (DNN), single network slice selection assistance information (S-NSSAI), a PCF instance, and a PCF set identifier for a PDU session. For example, a PCF corresponding to the terminal may be queried from the BSF.

The NWDAF has at least one of the following functions: a data collection function, and a data analysis function. The data collection function is for collecting related data from a network element, a third-party service server, a terminal, or a network management system. The data analysis function is for performing analysis and training based on related input data, and providing a data analysis result for a network element, a third-party service server, a terminal, or a network management system. The analysis result may assist a network in selecting a quality of service parameter of a service, or assist the network in performing routing of traffic, or assist the network in selecting a background traffic transmission policy. This application mainly involves the data collection function of the NWDAF. Because the NWDAF may only perform related training and analysis functions based on collected data, a premise thereof is to be able to collect and obtain related data. In a possible implementation, the NWDAF network element may be integrated with another NF, or the NWDAF may be independently deployed. In addition, a plurality of NWDAFs may be deployed in a network.

The RAN is a network including one or more access network devices (which may also be referred to as RAN nodes or network devices), and implements functions such as a radio physical layer function, resource scheduling and radio resource management, a radio access control and mobility management function, quality of service management, and data compression and encryption. The access network device is connected to the UPF through a user plane interface N3, and is configured to transmit data of a terminal. The access network device establishes a control plane signaling connection to the AMF through a control plane interface N2, to implement functions such as radio access bearer control.

The access network device may be a base station, a wireless fidelity (Wi-Fi) access point (AP), a worldwide interoperability for microwave access (WiMAX) site, or the like. There may be various forms of base stations, for example, a macro base station, a micro base station (also referred to as a small cell), a relay station, and an access point. The base station may be specifically: an AP in a wireless local area network (WLAN), a base transceiver station (BTS) in a global system for mobile communications (GSM) or a code division multiple access (CDMA), or a NodeB (NB) in wideband code division multiple access (WCDMA), or an evolved NodeB eNB or eNodeB), or a relay station or an access point in the LTE, a vehicle-mounted device, a wearable device, or the next generation NodeB (gNB) in a future 5G system, or a base station in a future evolved public land mobile network (PLMN) network, or the like.

The terminal may be a wireless terminal or a wired terminal. The wireless terminal may be a device that provides a user with voice and/or data connectivity, a handheld device with a wireless connection function, or another processing device connected to a wireless modem. The terminal and the access network device communicate with each other by using an air interface technology (for example, an NR technology or an LTE technology). The terminals may also communicate with each other by using an air interface technology (for example, an NR technology or an LTE technology). The wireless terminal may communicate with one or more core network devices such as the AMF, the SMF and the like through the access network device. The wireless terminal may be a mobile terminal, for example, a mobile phone (or referred to as a "cellular" phone), a smartphone, a satellite wireless device, a wireless modem card, or a computer with a mobile terminal. For example, the computer with the mobile terminal may be a laptop, a portable, a pocket-sized, a handheld, a computer built-in, or an in-vehicle mobile apparatus that exchanges voice and/or data with the access network device. For example, the wireless terminal may be device such as a personal communication service (PCS) phone, a cordless phone, a session initiation protocol (SIP) phone, a wireless local loop (WLL) station, a personal digital assistant (PDA), virtual reality (VR) glasses, augmented reality (AR) glasses, a machine-type communication terminal, or an internet of things terminal. In communication of the internet of vehicles, a communication device mounted on a vehicle is a kind of terminal, and a road side unit (RSU) may also be used as a kind of terminal. A communication device mounted on an unmanned aerial vehicle may also be regarded as a kind of terminal. The wireless terminal may also be referred to as a user equipment (UE), a terminal device, a subscriber unit, a subscriber station, a mobile station, a mobile platform, a remote station, an access point, an access terminal, a user terminal, a user agent, or the like.

The DN refers to an operator network such as an internet protocol multi-media service (IP multi-media service, IMS) or the internet that provides a data transmission service for a user. The terminal establishes a PDU session among the terminal, the access network device, the UPF, and the DN to access the DN.

It may be understood that, in addition to the function network elements shown in FIG. 1, the network architecture of the 5G network may further include another function network element. In embodiments of this application, the network element may also be referred to as an entity, a device, or the like.

It should be noted that the RAN, the AMF, the SMF, the AUSF, the UDM, the UPF, the PCF, the BSF, the NWDAF, the NRF, the NEF, and the like in FIG. 1 are merely names, and the names constitute no limitation on the network elements. In a 5G system and another future network, entities or devices corresponding to these network elements may have other names. This is not specifically limited in embodiments of this application. For example, the UDM may alternatively be replaced with a home subscriber server (HSS), a user subscription database (USD), a database network element, or the like. A general description is provided herein, and details are not repeated below again.

In the network architecture of the foregoing 5G system, the NWDAF network element is introduced since 3GPP Release15 (R15), to obtain related data of a terminal, a network (for example, a RAN, a CN, a transmission network (TN), and the like), an AF, and domains such as operation, administration, and maintenance (OAM), and perform training analysis based on a large amount of obtained data through a machine learning method to generate an analysis result. The analysis result may assist network policy formulation and execution. For example, the NWDAF generates a service experience analysis result based on data obtained from a network and data obtained from the AF. The service experience analysis result may help the PCF formulate PCC and QoS policies related to a terminal service.

A plurality of NWDAFs may be deployed in a communication network at the same time. From a dimension, different NWDAFs are responsible for analysis work for different purposes. For example, some NWDAFs are responsible for analyzing a movement track of a terminal, some NWDAFs are responsible for analyzing a service experience, and some NWDAFs are responsible for analyzing an abnormal behavior of the terminal. From another dimension, different NWDAFs are responsible for different service areas. For example, some NWDAFs are responsible for data analysis in an area 1, and another NWDAF is responsible for data analysis in an area 2.

It may be understood that the network elements or the functions may be network elements in a hardware device, software functions running on dedicated hardware, or virtualized functions instantiated on a platform (for example, a cloud platform). One or more services may be obtained through division into the network elements or the functions. Further, services that exist independently of network functions may occur. In this application, instances of the functions, instances of services included in the functions, or instances of services that exist independently of network functions may be referred to as service instances.

It should be noted that embodiments of this application are not limited to the foregoing system architecture, and may alternatively be applied to another future communication system, for example, a 6th generation communication (6G) system architecture. In addition, in embodiments of this application, names of the foregoing used network elements may change while functions of the network elements may remain the same in a future communication system.

The user in embodiments of this application may be a person or an object that uses a terminal device to perform a communication service in a network. In addition, the user may alternatively be a terminal device, for example, a terminal device in the internet of things. User information in embodiments of this application is for identifying a user, and a form of the user information is not limited herein, provided that the user information may play a role of identifying and distinguishing a user. The user information may be an international mobile subscriber identification number (IMSI), a subscription permanent identifier (SUPI), a generic public subscription identifier (GPSI), a user internet protocol (IP) filter/5-tuple (UE IP filter/5-tuple), a mobile station international ISDN number (MSISDN), an international mobile equipment identification number (IMEI), or the like. The user information may further be an identifier of an area in which the user is located, an identifier of the user, an identifier of a user group to which the user belongs, an identifier of a network slice corresponding to the user, a data network name DNN of the user, and an identifier of a network element to which the user belongs.

User-related data is user-level data protected by the GDPR. In embodiments of this application, the user-related data may include one or more of the following first data or second data: the first data includes raw data and/or processed data, and the raw data includes data generated by a terminal device, an application server, or a network device for a user. The data may be data that has been reported to an operator network.

The data generated by the terminal device for the user may include one or more of the following data: data generated by the user on the terminal device, data of the terminal device, and data generated by the terminal device for the user. The data generated by the user on the terminal device may be, for example, global positioning system (GPS) information of the terminal device, an input habit of the user on the terminal device, and the like. The data of the terminal device used by the user may be, for example, a type approval code (TAC), a memory capacity, and a CPU model of the terminal device. The data generated by the terminal device for the user may be, for example, a port number allocated by the terminal device to the user, or storage space allocated to the user.

The data generated by the application server for the user may be described as application layer data corresponding to the user. In embodiments of this application, the application layer data corresponding to the user includes one or more types of the following data: data generated by the user in an application server, data of the application server corresponding to the user, and data generated by the application server for the user. The data generated by the user in the application server may be, for example, a type of a service used by the user, or information of an IP 5-tuple corresponding to the service of the user. The data of the application server corresponding to the user may be a type of a service that can be provided by the application server, an IP address and a port number corresponding to each type of a service, a basic function of each service, storage space of the application server, or the like. The data generated by the application server for the user may be, for example, information about an identifier of an application layer allocated by the service server to the user, a service requirement allocated to the service of the user, or quality information of the service of the user.

The data generated by the network device for the user may include one or more types of the following data: data generated by the user on an access network and/or a core network; data of an access network and/or a core network corresponding to the user; and data generated by the access network and/or the core network for the user. The data generated by the user on the access network and/or the core network may be, for example, location information (for example, an identifier of a cell or an identifier of a TA) of the user, or information about a network slice that the user requests to access. The data of the access network and/or the core network corresponding to the user may be, for example, a capacity of a cell in the access network, load information of an AMF, or bandwidth information of a UPF. The data generated by the access network and/or the core network for the user may be, for example, bandwidth allocated by the access network to a service of the user, information about a slice selected by the core network AMF for the user, or information about a QoS policy customized by a PCF for a service of the user. Specifically, in embodiments of this application, the network data of the user includes data on an access network corresponding to the user. Alternatively, in embodiments of this application, the network data of the user includes data on a core network corresponding to the user. Alternatively, in embodiments of this application, the network data of the user includes data on an access network corresponding to the user and data on a core network corresponding to the user. The access network may also be described as an access network of a communication operator, and the core network may also be described as a core network of a communication operator.

The processed data is data generated after corresponding processing such as aggregation (data weighting of a plurality of UEs or data averaging of a single UE within a period of time), or anonymization (removing identification information of UE), or the like is performed on the raw data.

Specifically, to distinguish between different data in the first data, a data type or an event identifier may be used to distinguish between different data in the first data. The data type or the event ID is used as an example. For example, the data type=a reference signal received power (RSRP) at a location of a cell in which the UE is located. In another example, the event ID=UE location.

The second data is a data analysis result obtained by performing data analysis based on the first data, for example, a UE movement information analysis result, a UE abnormal behavior analysis result, or a UE service behavior analysis result generated by the NWDAF. Specifically, to distinguish between different data analysis results, analytics identifiers analytics IDs may be used for identification.

As a request for authorization information, the first network element in this embodiment may only request to obtain the authorization information; or the first network element may also serve as a data requester, to request to obtain user-related data when requesting the authorization information. The first network element may be an NWDAF network element, or may be another network element that needs to obtain the user-related data, for example, an NEF network element, an AMF network element, or an AF network element. When requesting authorization information of the user-related data, the first network element may include a use scope in a sent request. The use scope may include information such as a use object, a use purpose, and use time. The use object is for indicating an object on which the obtained user-related data is to be used. The object has a plurality of representation forms, for example, a public land mobile network (PLMN) identifier, a network domain (RAN domain, and OAM domain), an NF network element type (AMF type and SMF type), an NF network element instance identifier, an AF type, an AF instance identifier, or an application identifier. For example, when the object is the core network domain, it indicates that the use object is network elements of an entire core network.

The use purpose is for indicating a purpose of using the user-related data, that is, what the user-related data is used for. The use purpose may be defined differently based on specific data in the obtained user-related data. For example, when the requested data is the first data, the use purpose may be obtaining the data analysis result or opening to a third-party AF for use, or which data analysis result to be specifically obtained may be further defined, for example, a movement track analysis result of the user is obtained. When the requested data is the second data, the use purpose may be opening to a third-party AF for use, or may be further limiting a specific use of opening to the third-party AF, for example, performing epidemic monitoring, service application layer parameter adjustment, or paging area optimization.

The use time is for indicating time when the use object uses the user-related data, and may include a time period and/or a duration. For example, after obtaining the user-related data, the use object uses the user-related data in a period from Jan. 1, 2020 to Dec. 31, 2020, or after obtaining the user-related data, the use object uses the user-related data for six months after obtaining time.

In embodiments of this application, a second network element is configured to obtain, store, and process the authorization information of the user-related data. The second network element may be a data management UDM network element, a data repository UDR network element, an authentication server function AUSF network element, a network exposure function NEF network element, a terminal device, or the like. In a future communication system, the second network element may still be the UDM network element, the UDR network element, or may have other names. This is not limited in this application.

In embodiments of this application, the second network element may obtain the authorization information of the user-related data through the following methods:

In one method, the second network element obtains the authorization information of the user-related data in a dynamic obtaining manner, and the method specifically includes: in an initial network registration or mobility registration process, the terminal device triggers reporting of authorization information of a user to a network element (such as an AMF) on a network side, and the network element then stores the authorization information of the user to the second network element (such as a UDM). Alternatively, when initiating PDU session establishment or procedure modification, the terminal device triggers reporting of authorization information of a user to a network element (such as an SMF) on a network side, and the network element then stores the authorization information to the second network element (such as a UDM). Alternatively, the second network element queries a terminal device of the user for the authorization information of the user due to a trigger condition (another network element queries the second network element), and the terminal device sends the authorization information to the second network element, so that the second network element stores the authorization information of the user.

In another method, the second network element obtains the authorization information in a static configuration manner. Specifically, in a subscription phase before a user accesses a network, the terminal device stores the authorization information as subscription information in the second network element. When authorization information of a user changes, the subscription information in the second network element is updated, to update the authorization information.

The authorization information may include user information (identifying a user), a data type (such as first data and second data), a use scope (a use object, a use purpose, and use time), and authorization status information (yes, no, unknown, and the like). When receiving authorization information sent by terminal devices of a plurality of users, the second network element stores, for each user, authorization information corresponding to the user. Which data is allowed to be used, which objects are allowed to use the data, a purpose for which the data is allowed to be used, a time for which the data is allowed to be used, and the like may be learned from content included in the authorization information. Specifically, after obtaining the authorization information of the user, the second network element may store the authorization information of the user as subscription information of the user, and store a correspondence between the subscription information and a user identifier; or may store the authorization information of the user as context information of the user, and store a correspondence between the context information and the user identifier.

The authorization information of the user-related data in this embodiment is for indicating whether a user corresponding to the user information allows the user-related data to be used in a requested use scope. Specifically, there may be a plurality of options. For example, the authorization information may be any one of "yes", "no", or "unknown". If the authorization information is "yes", it indicates that the user-related data is allowed to be used. If the authorization information is "no", it indicates that the user-related data is not allowed to be used. If the authorization information is "unknown", it indicates that an attitude of the user towards whether the user-related data is allowed to be used is not clear, that is, it is currently uncertain whether the user allows the user-related data to be used. In this case, it may be understood that the user does not authorize, that is, does not allow the user-related data to be used. With reference to a plurality of cases of the foregoing user-related data, the authorization information in embodiments of this application may indicate: any one or more of whether the first data is allowed to be used, whether the second data is allowed to be used, whether one piece of data or some pieces of data in the first data are allowed to be used, whether one piece of data or some pieces of data in the second data are allowed to be used, or the like. For example, the authorization information indicates that the first data is allowed to be used. In another example, the authorization information indicates that the first data is allowed to be used, but the second data is not allowed to be used. In another example, the authorization information indicates that data a1 in the first data is allowed to be used, but data a2 in the first data is not allowed to be used. In another example, the authorization information indicates that the first data is not allowed to be used, data b1 in the second data is allowed to be used, and data b2 in the second data is not allowed to be used.

For example, Table 1 shows an example of a representation form of the authorization information of the user-related data, and a first row and a third row in Table 1 are used as examples for description. As shown in the first row, user-related data requested by a data requester is data corresponding to an event ID1 in the first data, a user identifier is ID1, a corresponding use scope includes a network element whose use object is an NWDAF type, a use purpose is to perform analytics ID1 analysis, use time is a network registration period of UE, and authorization information is "yes". In this case, the first row indicates: an ID1 user allows data corresponding to the event ID1 to be used in the network element whose use object is the NWDAF type, the use purpose is to perform data analysis corresponding to the Analytics ID1, and the use time is a use scope corresponding to the network registration period of the UE. As shown in the third row, user-related data is data corresponding to Analytics ID1 in the second data, a user identifier is ID1, a use object is an AF instance ID, a use purpose is epidemic monitoring, use time is from Jan. 1, 2020 to Dec. 30, 2020, and authorization information is "no". In this case, the third row indicates: an ID1 user does not allow the data corresponding to the Analytics ID1 to be used in a use scope corresponding to a case in which the use object is the AF instance ID, the use purpose is epidemic monitoring, and the use time is from Jan. 1, 2020 to Dec. 30, 2020.

TABLE 1

| Representation form of authorization information of a user | | | | | |
|---|---|---|---|---|---|
| User identifier | User-related data | Use object | Use purpose | Use time | Authorization information |
| ID1 | Event ID1 | NWDAF type | Analytics ID1 | Network registration period of UE | Yes |

TABLE 1-continued

| | Representation form of authorization information of a user | | | | |
|---|---|---|---|---|---|
| User identifier | User-related data | Use object | Use purpose | Use time | Authorization information |
| | Event ID2 | PLMN ID | Analytics ID2 | Contract renewal period | Unknown |
| | Analytics ID1 | AF instance ID | Epidemic monitoring | 20201.1-12.30 | No |
| | | AMF instance ID | Paging area optimization | 10 years | Yes |

For the first data, the authorization information may further indicate any one or more of whether terminal device data corresponding to the user is allowed to be used, whether network data of the user is allowed to be used, and whether application server data corresponding to the user is allowed to be used. For example, the authorization information indicates that the terminal device data corresponding to the user is allowed to be used. In another example, the authorization information indicates that the terminal device data corresponding to the user is allowed to be used, but the network data of the user is not allowed to be used. In another example, the authorization information indicates that the terminal device data corresponding to the user is allowed to be used, and the network data of the user is allowed to be used, but the application server data corresponding to the user is not allowed to be used.

In this embodiment, the authorization information may further include other limitation information, and the other limitation information limits the user-related data. The other limitation information includes any one or more of the following: time information, location information, a service type, data network name (DNN) information, an application identifier, and network slice information. The network slice information may be network slice identifier information, for example, network slice selection assistance information (NSSAI), single-network slice selection assistance information (S-NSSAI), a network slice instance (NSI) identifier, or a network slice subnet instance (NSSI) identifier. For example, if the limitation information is a preset time period and a preset location scope, the authorization information indicates whether user-related data generated within the preset time period and the preset location scope is allowed to be used. It should be noted that the time information identifier, the location information, the service type, the DNN information, and the like in this embodiment all indicate information such as a corresponding time, area, service, and DNN when the user-related data is generated.

In this embodiment, if the authorization information of the user-related data is divided based on the limitation information such as the location information, the time information, the service type, the application identifier, the DNN, and the network slice information, according to the foregoing implementation, the user may report authorization information corresponding to all areas, all time, all service types, all application identifiers, all DNNs, and all slices of the user at one time. Alternatively, the user may report authorization information corresponding to different areas, different time, different service types, different DNNs, and different slices at different times.

Based on the foregoing content, for ease of understanding specific implementations of embodiments of this application, the following provides descriptions with reference to the accompanying drawings.

Figure 2:
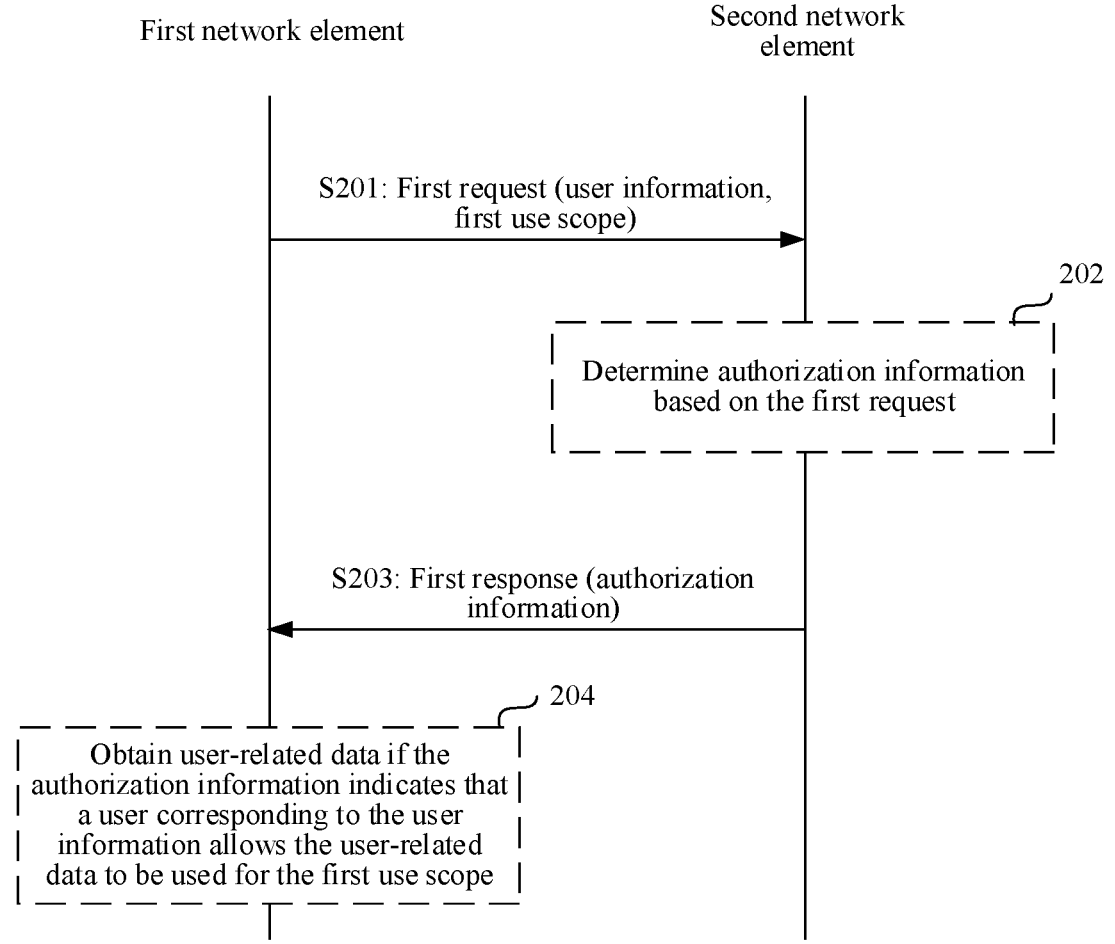
FIG. 2 is a flowchart of a communication method according to an embodiment of this application.

FIG. 2 is a flowchart of a communication method according to an embodiment of this application. As shown in FIG. 2, the method may include the following steps.

S201: A first network element sends a first request to a second network element.

In this embodiment, to obtain authorization information of user-related data, the second network element may send the first request to the second network element. The first request is for requesting the authorization information of the user-related data. The first request may include user information and a first use scope of data corresponding to the user information.

The first use scope may include one or more of a first use object, a first use purpose, and first use time. The first use object is an object that uses the user-related data, the first use purpose is a specific purpose of using the user-related data, and the first use time is time of using the user-related data. The first use time may include a use duration and/or a specific use time period.

The second network element may be a network element such as a UDM, a UDR, an AUSF, or an NEF, or a terminal device. For ease of understanding, an example in which the second network element is the UDM is used for description. The authorization information of the user-related data may be stored in user subscription information stored in the UDM. For example, when a user performs subscription, authorization information of the user may be set, and the authorization information is stored in the UDM as a part of subscription information. The first network element invokes, through a service-based interface, a Nudm SDM Get service provided by the UDM to obtain the subscription information of the user.

Specifically, the first network element may obtain authorization information of only one user from the UDM at one time. In this case, the first network element provides an identifier of only one user for the UDM. Correspondingly, the UDM feeds back the authorization information of only one user to the first network element at one time. In another implementation, the first network element may also obtain authorization information of a plurality of users from the UDM at one time. In this case, the first network element provides information that may indicate identifiers of the plurality of users for the UDM. The identifiers of the users may be identifiers of user groups, identifiers of areas in which the plurality of users are located, identifiers of network elements, identifiers of network slices, DNNs, or the like. Correspondingly, the UDM feeds back the authorization information of the plurality of users to the first network element at one time.

In some implementations, the first request may further include a first type identifier, and the first type identifier is for identifying a type of the user-related data. In this case, the first request is for requesting authorization information of user-related data corresponding to the first type identifier.

Specifically, the first type identifier is for identifying first data and second data in the user-related data. When the user-related data is the first data, the first type identifier may be an event identifier, and the first data is data related to an event corresponding to the event identifier. When the user-related data is the second data, the first type identifier may be an analytics identifier, and the second data is a data analysis result corresponding to the analytics identifier.

In some implementations, the first request may further include a filter criterion, and the first request is for requesting to obtain authorization information of a user that meets the filter criterion. The filter criterion may include any one or more of the following content: time information, location information, a service type, data network name DNN information, and network slice information. In this embodiment, the time information indicates a time at which the user-related data is generated, the location information indicates a location at which the user-related data is generated, the service type indicates a service that generates the user-related data, the data network name DNN information indicates information about a DNN that generates the user-related data, and the network slice information indicates information about a slice that generates the user-related data.

A trigger condition for the first network element to send the first request to the second network element to request the authorization information of the user may be a requirement of the first network element that the first network element actively sends the first request to the second network element, or that, after the first network element receives a second request sent by a third network element (such as an AF or an NF), the first network element sends the first request to the second network element according to the second request. The second request is for requesting to obtain the user-related data. That is, the trigger condition for the first network element to send the first request to the second network element is that the second request sent by the third network element is received. In this case, the first network element generates the first request based on the second request, and sends the first request to the second network element.

The second request may include user information and a second type identifier, the second type identifier is for identifying a type of user-related data requested by the third network element, and the second type identifier may identify the first data and/or the second data in the user-related data. The second request may further include a third use scope, and the third use scope may include one or more of the following information: a third use object, a third use purpose, third use time, and the like. After receiving the second request sent by the third network element, the first network element generates the first request based on information included in the second request. Specifically, the first network element obtains the first use scope based on the third use scope. The first network element determines the first type identifier based on the second type identifier. That the first network element obtains the first use scope based on the third use scope may include: the first network element directly determines the third use scope as the first use scope, or the first network element obtains the first use scope based on the third use scope and configuration information. The configuration information indicates a mapping relationship between the third use scope and the first use scope. In addition, that the first network element determines the first type identifier based on the second type identifier may include: the first network element directly determines the second type identifier as the first type identifier, or the first network element obtains the first type identifier based on the second type identifier and configuration information. The configuration information identifies a mapping relationship between the first type identifier and the second type identifier. For example, when the user-related data requested by the third network element is data corresponding to an event identifier in the first data, the second type identifier is an event ID. If the first network element intends to request an authorization information event corresponding to the event ID from the second network element, the first network element may determine the event ID as the first type identifier. In another example, if the user-related data requested by the third network element is a data analysis result in the second data, the second type identifier is an analytics identifier (analytics ID). If the first network element intends to request authorization information corresponding to the analytics ID from the second network element, the second network element determines the analytics ID as the first type identifier. In another example, if the user-related data requested by the third network element is a data analysis result in the second data, the second type identifier is an analytics identifier (analytics ID). In this case, the first network element needs to determine an event identifier of first data corresponding to the analytics identifier based on the analytics identifier and the configuration information, and the first type identifier is the event identifier. The event identifier may be represented by an event ID or a data type. S203: The second network element sends a first response to the first network element.

In this embodiment, when receiving the first request sent by the first network element, the second network element may obtain authorization information of corresponding user-related data based on the first request, to send the authorization information to the first network element through the first response, so that the first network element obtains the authorization information of the user. The authorization information indicates whether a user corresponding to the user information allows the user-related data to be used for the first use scope. For example, the authorization information indicates whether the user corresponding to the user information allows the user-related data to be used by the first use object, whether the user-related data is allowed to be used for the first use purpose, whether the user-related data is allowed to be used in the first use time, and the like.

The second network element may directly send the first response to the first network element, or may send the first response to the first network element through another intermediate network element.

Before sending the first response, the second network element may further perform step S202.

S202: The second network element determines the authorization information of the user based on the first request.

The second network element may determine the authorization information of the user based on the first request in the following a plurality of methods:

According to a method, the second network element determines the authorization information corresponding to the user information based on whether the first request matches stored authorization information of a network user. In this implementation, the second network element may pre-store authorization information of a user in a network. When receiving the first request sent by the first network element, the second network element may perform matching based on user information in the first request and the pre-stored authorization information of the user in the network. If authorization information of a user corresponding to the user information exists in the pre-stored authorization information of the user in the network, the second network element determines the authorization information of the user. Specifically, the second network element performs one-to-one matching based on each item of content included in the first use scope in the first request, and determines the authorization information based on a matching result of each item. For example, when the first use scope includes only the first use object, the first use object is matched with a use object in authorization information of a network user. If the two match, it is determined that the authorization information is that the user-related data is allowed to be used for the first use scope; or if the two do not match, it is determined that the authorization information is that the user-related data is not allowed to be used for the first use scope. In another example, when the first use scope includes the first use object and the first use time, the first use object is matched with the use object in the authorization information of the network user to obtain a first result; and the first use time is matched with use time in the authorization information of the network user to obtain a second result. When both the first result and the second result are matching, it is determined that the authorization information is that the user-related data is allowed to be used for the first use scope; or when the first result or the second result is not matching, it is determined that the authorization information is that the user-related data is not allowed to be used for the first use scope.

According to another method, after receiving the first request sent by the first network element, the second network element determines a terminal device corresponding to the user information through the user information in the first request. The second network element sends a third request to the terminal device based on the first request, and the third request is for requesting the authorization information corresponding to the user information from the terminal device. After receiving the third request, the terminal device sends a third response to the second network element, and the third response includes the authorization information corresponding to the user information.

According to still another method, after receiving the first request sent by the first network element, the second network element sends a fourth request to a fourth network element based on the first request, and the fourth request is for requesting the authorization information corresponding to the user information. After receiving the fourth request, the fourth network element determines the authorization information corresponding to the user information based on the fourth request, and sends a fourth response to the second network element. The fourth response includes the authorization information corresponding to the user information. In this implementation, the fourth network element may pre-store the authorization information of the user. Related content in this part is similar to the foregoing content, and details are not repeated herein again. The fourth network element may be an AF, UE, or the like. The second network element may directly send the fourth request to the fourth network element, or may send the fourth request to the fourth network element through another network element. For example, when the fourth network element is an AF network element, the second network element sends the fourth request to the fourth network element through an NEF network element.

After step S203, the method may further include the following steps:

S204: If the authorization information indicates that a user corresponding to the user information allows the user-related data to be used for the first use scope, the first network element obtains the user-related data.

In this embodiment, when the authorization information in the first response received by the first network element from the second network element indicates that the user-related data of the user corresponding to the user information is allowed to be used for the first use scope, the first network element may obtain the user-related data.

In some implementations, when the trigger condition of the first request sent by the first network element to the second network element is that the third network element sends the second request to the first network element, and when the authorization information indicates that the user-related data corresponding to the user information is allowed to be used for the first use scope, the first network element may send a second response to the third network element, and the second response includes the user-related data, so that the third network element obtains the user-related data.

Specifically, when the user-related data requested by the third network element is the first data, when obtaining the user-related data, the first network element may send the user-related data to the third network element. When the user-related data requested by the third network element is the second data, in an implementation, if the first network element obtains the second data from another network element having a data analysis function, and then sends the second data to the third network element; and in another implementation, if the first network element already has the data analysis function, the first network element may also first obtain first data corresponding to the second data, perform data analysis on the first data to obtain corresponding second data, and then send the second data to the third network element. In this implementation, the third network element may be an application server AF, a network function NF network element, a network management system network element, a terminal device, or the like.

In some implementations, when the authorization information indicates that a user corresponding to user information does not allow the user-related data to be used for the first use scope, the first response may further include cause information for indicating why the user-related data is not allowed to be used. The cause information indicates a cause why a piece of data or some pieces of data are not allowed to be used, for example, a data type is not within an authorization scope of UE, a use object is not within an authorization scope of UE, a use purpose is invalid, or use time is not within an authorization scope of UE.

It can be learned from the foregoing steps that, before obtaining the user-related data, the first network element obtains the authorization information of the user in advance, and the first network element obtains the user-related data only when the user-related data is allowed to be used, thereby prohibiting the user-related data from being obtained at will and protecting the user-related data.

In some implementations, the first network element may obtain the user-related data through the following implementations. In an implementation, when the user-related data is the first data, the first request may include an event identifier (for example, an event ID), to identify a specific category of data that the first network element intends to obtain through a data identifier. The first network element sends a fifth request to a fifth network element, and the fifth request includes an event identifier. The first network element receives a fifth response sent by the fifth network element, and the fifth response includes first data corresponding to the event identifier. That is, the first network element obtains the user-related data by sending the fifth request to the fifth network element. The fifth network element is a network element in which user-related data that the first network element intends to obtain is located. For example, the fifth network element may be an NF, an AF, UE, an OAM, or the like.

In another implementation, when the user-related data is second data, the first request may include an analytics identifier (for example, an analytics ID), and the analytics identifier is for identifying a category of a specific data analysis result that the first network element intends to obtain. Because the second data is data obtained by performing data analysis based on the first data, before obtaining the second data, the first network element may first obtain first data corresponding to the second data. Specifically, the first network element determines, based on an analytics identifier corresponding to the second data, an event identifier (for example, an event ID) corresponding to the first data. The first network element obtains the first data based on the event identifier, and the first network element generates the user-related data based on the first data. In this implementation, the first network element may obtain the first data through the following methods. The first network element may obtain, for example, the first data pre-stored in the first network element, or may obtain the first data from another network element, such as an NF, an AF, UE, or an OAM.

In some implementations, when authorization information of the user-related data obtained by the first network element is authorization information corresponding to the first data, a first use purpose in the first use scope may be performing data analysis, that is, the first data is for performing data analysis. Further, the first use scope may further include an event identifier, and the first data is data related to an event corresponding to the event identifier. Further, when the first use purpose is to perform data analysis, the first use scope may further include an analytics identifier, and the analytics identifier is for indicating to perform data analysis on the first data to obtain a data analysis result corresponding to the analytics identifier. For example, if the event identifier event ID=user location data, and the analytics identifier analytics ID=user mobility analysis, it is indicated to perform data analysis on the user location data, to obtain a user mobility analysis result.

Further, the first request may further include a second use scope, and the second use scope includes at least one of the following information: a second use object, a second use purpose, second use time, or the like. The second use object is for indicating an object for which the data analysis result is to be used, the second use purpose is for indicating a purpose for which the data analysis result is to be used, and the second use time is for indicating a time for which the data analysis result is to be used. For example, if the data analysis result is the user mobility analysis result, the second use object is for indicating an object for which the user mobility analysis result is to be used, for example, an AF or an AMF network element. The second use purpose is for indicating a purpose for which the user mobility analysis result is to be used, for example, epidemic monitoring or paging area optimization. The second use time is for indicating time for which the user mobility analysis result is to be used, for example, from Jan. 1, 2020 to Dec. 30, 2020.

In some implementations, when the first network element is a network data analytics function NWDAF network element, the second network element may be a unified data management UDM network element, a unified user data repository UDR network element, an authentication service function AUSF network element, or a terminal device.

In some implementations, when the first network element is a network exposure function NEF network element, the second network element is a unified data management UDM network element, a unified user data repository UDR network element, an authentication service function AUSF network element, or a terminal device.

In some implementations, when the first network element is an access and mobility management function AMF network element, the second network element is a unified data management UDM network element, a unified user data repository UDR network element, an authentication service function AUSF network element, or a terminal device.

In some implementations, when the first network element is an application function AF network element, the second network element is a network exposure function NEF network element.

It should be noted that, regardless of which network elements the first network element and the second network element are specifically, the authorization information of the user-related data may be obtained according to the embodiment shown in FIG. 2.

It should be noted that not every step in the method embodiment provided in FIG. 2 is mandatory. Some steps in the method embodiment provided in FIG. 2 are optional, for example, S202 and S204 in FIG. 2.

For ease of understanding the foregoing procedure, the following uses an example in which a third-party AF (a third network element) requests a data analysis result of a user from an NWDAF (a first network element), and the NWDAF queries authorization information from a UDM for description.

Figure 3:
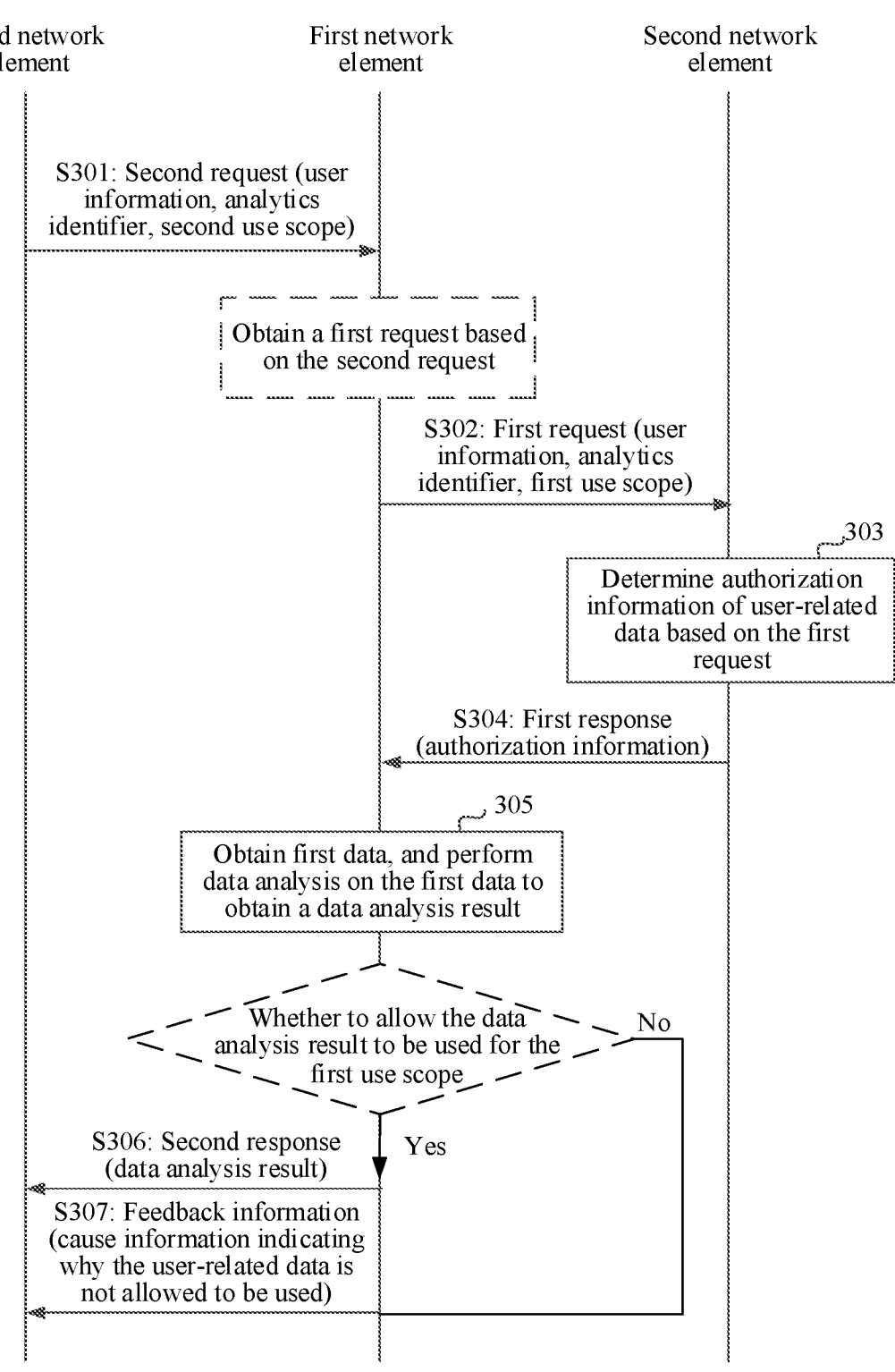
FIG. 3 is a flowchart of another communication method according to an embodiment of this application.

FIG. 3 is a flowchart of another communication method according to an embodiment of this application. Content in this embodiment of this application that is the same as that in the embodiment in FIG. 2 may be specifically referred to the description of the embodiment in FIG. 2. As shown in FIG. 3, the method may include the following steps.

S301: A third network element sends a second request to a first network element, and the second request is for requesting to obtain user-related data.

In this embodiment, when intending to obtain second data, the third network element may send the second request to the first network element. A second type identifier in the second request may be a specific analytics identifier (analytics ID), to identify a specific data analysis result requested by the third network element through the analytics identifier. The data analysis result needs to be obtained by performing data analysis by the first network element based on corresponding first data. The second request may include an identifier or an application identifier (application ID) of the third network element, to describe an object for which the second data is used through the identifier. The second request may further include user information, and the user information indicates a user whose second data is requested by the third network element. A specific representation form of the user information may be referred to the foregoing embodiments, and details are not repeated herein again in this embodiment.

The second request may further include a third use scope, and the third use scope includes one of the following information: a third use object, a third use purpose, third use time, and the like. The third use object identifies an object that uses the data analysis result, the third use purpose identifies a specific purpose of using the data analysis result, and the third use time identifies a specific time at which the data analysis result is used.

S302: The first network element sends a first request to a second network element based on the second request, and the first request is for requesting authorization information of user-related data.

In this embodiment, after determining the second request sent by the third network element, the first network element may generate the first request based on the received second request, and send the first request to the second network element, to obtain the authorization information of the user-related data. That is, the first network element uses the second request sent by the third network element as a trigger condition for querying the second network element for the user authorization information. The first network element may generate the first request based on the second request. A specific implementation may be referred to the description in the foregoing embodiment. Details are not repeated in this embodiment again. For example, when the user information in the second request is an external identifier of the user, the first network element may convert a network external identifier of the user into a network internal identifier of the user based on configuration information, to include the network internal identifier of the user in the first request.

S303: The second network element determines the authorization information of the user based on the first request.

In this embodiment, the second network element may obtain authorization information of a user corresponding to the user information based on the authorization information of the user stored by the second network element and the first request.

Specifically, the second network element determines, based on a first use scope and user information in the first request, whether the analytics ID is included in a data type of the authorization information of the user, whether a third network element ID or the application ID is included in an object that the user allows the analytics ID data analysis result to be used, whether a purpose of requesting to use the analytics ID data analysis result matches a purpose allowed by the user, and whether use time of requesting to use the analytics ID data analysis result matches use time allowed by the user. If all the foregoing conditions are met, the second network element determines that the user-related data is allowed to be used for the first use scope; otherwise, the second network element determines that the user-related data is not allowed to be used for the first use scope or corresponding authorization is unknown.

In addition, the second network element may further determine the authorization information of the user by sending a request to another network element. Specific implementation is similar to the foregoing content, and details are not repeated in this embodiment.

S304: The second network element sends a first response to the first network element, and the first response includes authorization information.

The authorization information indicates whether a user corresponding to the user information allows the user-related data to be used for the first use scope. Specifically, the authorization information may be that the user corresponding to the user information allows the user-related data to be used for the first use scope, or does not allow the user-related data to be used for the first use scope, or whether the user-related data is allowed to be used for the first use scope is unknown.

When the authorization information indicates that the user corresponding to the user information does not allow the user-related data to be used for the first use scope, the first response may further include a data type that is not allowed to be used (when the third network element requests a plurality of data analysis results at the same time), cause information why the user-related data is not allowed to be used, and the like.

S305: The first network element obtains first data, and performs data analysis on the first data to obtain a data analysis result.

When receiving the authorization information sent by the second network element, the first network element may obtain the first data based on the authorization information, to perform data analysis on the first data to obtain a data analysis result to be obtained by the third network element.

Specifically, the first network element determines, based on an analytics identifier in the second request, the first data that needs to be used for generating the data analysis result, and then the first network element obtains the first data. The first network element may obtain the first data through a plurality of methods. According to one method, the first data is stored in the first network element. According to the other method, the first network element sends a request to another network element, to request to obtain the first data. A specific implementation of obtaining the first data by the first network element is described in a subsequent embodiment.

When obtaining the first data, the first network element performs data analysis based on the obtained first data to obtain a data analysis result corresponding to the analytics ID.

S306: When the authorization information indicates that the user corresponding to the user information allows the user-related data to be used for the first use scope, the first network element sends a second response to the third network element, and the second response includes the user-related data.

In this embodiment, when the authorization information indicates that the user corresponding to the user information allows the related data to be used by the third network element, the first network element sends the data analysis result obtained in S305 to the third network element. Correspondingly, the third network element receives the data analysis result, and performs operations such as epidemic monitoring and paging area optimization by using the data analysis result.

S307: When the authorization information indicates that the user corresponding to the user information does not allow the user-related data to be used for the first use scope, the first network element sends a feedback message to the third network element, and the feedback message may include a cause value indicating why the user-related data is not allowed to be used.

When the authorization information indicates that the user corresponding to the user information does not allow the related data to be used by the third network element, the first network element sends feedback information to the third network element, and the feedback information indicates that the data analysis result requested by the third network element is rejected, and indicates a cause why the data analysis result is rejected to be used.

It should be noted that, in this embodiment, an execution condition of S305 may include the following two cases: in one case, when the first network element determines that the user corresponding to the user information allows the user-related data to be used for the first use scope, the first network element obtains the first data, performs data analysis on the first data to obtain a corresponding data analysis result, and performs S306. That is, if the authorization information indicates that the user corresponding to the user information does not allow the user-related data to be used for the first use scope, the first network element does not obtain the first data, and does not perform data analysis.

In the other case, regardless of whether the user corresponding to the user information allows the user-related data to be used for the first use scope, the first network element obtains the first data, performs data analysis based on the first data, and obtains a data analysis result. When the authorization information indicates that the user corresponding to the user information allows the user-related data to be used for the first use scope, the first network element sends the data analysis result to the third network element. When the authorization information indicates that the user corresponding to the user information does not allow the user-related data to be used for the first use scope, the first network element does not perform S306. That is, regardless of whether the user allows the user-related data to be used for the first use scope, the first network element may first obtain the first data, and perform data analysis to obtain the data analysis result. Then, the first network element determines whether to send the data analysis result to the third network element based on a specific indication of the authorization information.

It should be noted that not every step in the method embodiment provided in FIG. 3 is mandatory. Some steps in the method embodiment provided in FIG. 3 are optional, for example, S305 to S307 in FIG. 2.

It can be learned from the foregoing embodiment that the first network element obtains the first data through a plurality of methods. In addition to pre-storing related data of a user, the first network element may further obtain the first data by requesting from another network element. When obtaining the first data, the first network element may further request to obtain the authorization information of the user from the second network element. When the authorization information indicates that the user corresponding to the user information allows the user-related data to be used, the first network element obtains the first data. An example in which the first network element is an NWDAF and the second network element is a UDM is still used for description in the following embodiment.

Figure 4:
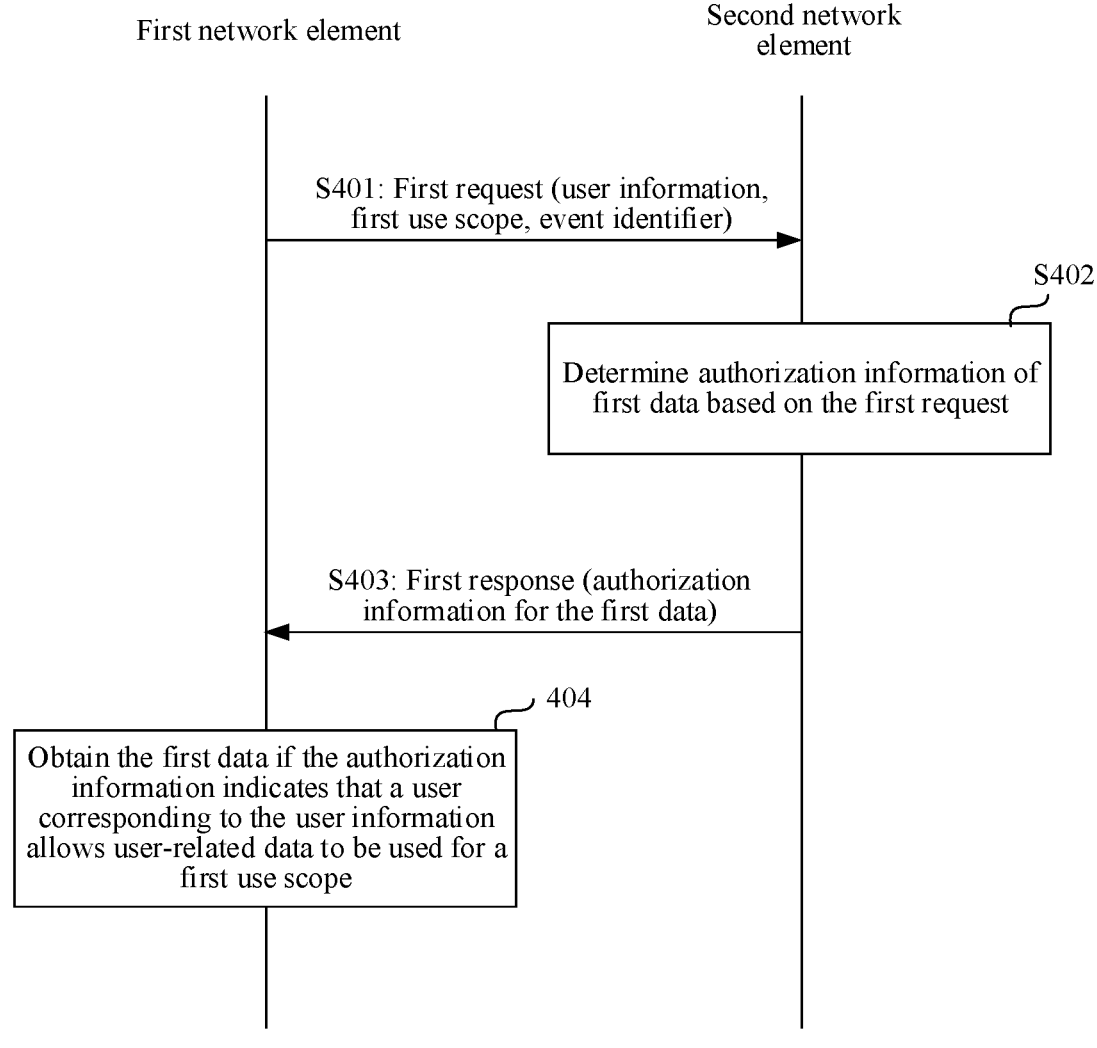
FIG. 4 is a flowchart of another communication method according to an embodiment of this application.

Referring to a flowchart of a communication method shown in FIG. 4, content in this embodiment of this application that is the same as that in the embodiments in FIG. 2 and FIG. 3 may be specifically referred to descriptions of the embodiments in FIG. 2 and FIG. 3. As shown in FIG. 4, the method may include the following steps:

S401: A first network element sends a first request to a second network element, and the first request is for requesting authorization information of user-related data.

In this embodiment, to obtain first data, the first network element first sends the first request to the second network element. The first request includes user information and a first use scope. The first use scope may include one of the following information: a first use object (for example, an NWDAF ID), a first use purpose (for example, performing data analysis analytics ID), and first use time (for example, from Jan. 1, 2020 to Jun. 1, 2020). Specifically, a first type identifier in the first request is an event identifier (for example, an event ID), to indicate a specific data type in the first data through the event identifier. When the first use purpose is to perform data analysis, the first use scope may further include an analytics identifier (for example, an analytics ID), and the analytics identifier is for indicating to perform data analysis on the first data to obtain a data analysis result corresponding to the analytics identifier. In addition, the first request may further include a second use scope, and the second use scope may include one or more of a second use object, a second use purpose, or second use time. The second use object indicates a use object of a data analysis result corresponding to the data analysis, and the second use purpose indicates a use purpose of the data analysis result. The second use time indicates use time of the data analysis result. That is, the second use scope is a further limitation on a fourth use purpose (obtaining a data analysis result).

S402: The second network element determines the authorization information of the user based on the first request.

A method through which the second network element determines the authorization information of the user based on the first request may be referred to a specific implementation of S302. Details are not repeated in this embodiment.

It should be noted that, when the first request further includes a second use scope corresponding to the data analysis result, the second network element determines, based on the user information and the second use scope, whether the data analysis result corresponding to the analytics ID is included in a data type of the authorization information of the user, whether the second use object is included in an object that the user allows the data analysis result corresponding to the analytics ID to be used, whether the second use purpose matches a purpose allowed by the user, and whether the second use time matches use time allowed by the user to use, to obtain authorization information for the second use scope.

S403: The second network element sends a first response to the first network element, and the first response includes authorization information.

S404. The first network element obtains the first data when the authorization information indicates that a user corresponding to the user information allows the first data to use the first use scope.

In this embodiment, when the first request further includes the second use scope corresponding to the data analysis result, the authorization information sent by the second network element includes both authorization information for the first use scope and authorization information for the second use scope. In this case, the authorization information may indicate that the user corresponding to the user information allows the first data to use a first scope, and indicate that the user corresponding to the user information allows a data analysis result corresponding to the first data to use a second scope.

In this way, the first network element may obtain the user-related data in a case that the user-related data is allowed to be obtained. The related data generated by the user in a communication operator network is obtained on a premise that the GDPR legislation is complied with. On the one hand, user-level data can be protected, and on the other hand, the data can be captured for training and analysis to assist in network policy formulation and execution.

It should be noted that not every step in the method embodiment provided in FIG. 4 is mandatory. Some steps in the method embodiment provided in FIG. 4 are optional, for example, S404 in FIG. 4.

Figure 5:
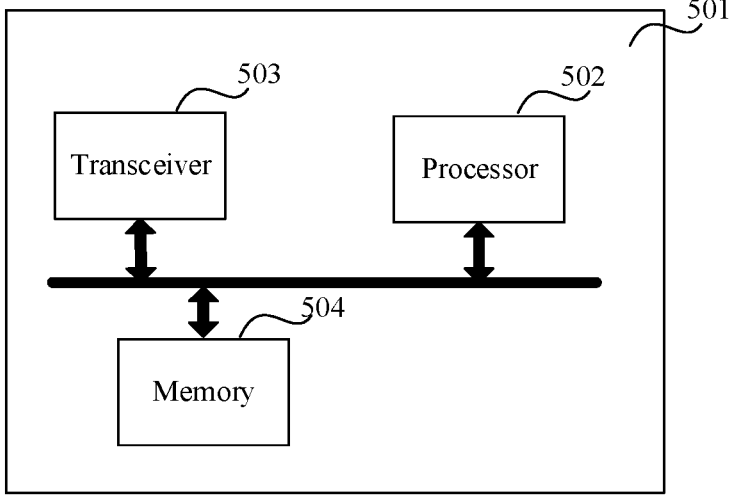
FIG. 5 is a schematic diagram of a structure of a communication device according to an embodiment of this application.

Based on the foregoing methods, FIG. 5 is a schematic diagram of a structure of a communication device according to an embodiment of this application. As shown in FIG. 5, the communication device may be a terminal device or a network device, or may be a chip or a circuit, such as a chip or a circuit that may be disposed in the terminal device, or a chip or a circuit that may be disposed in the network device. The network device in embodiments of this application may be any one or more of the first network element, the second network element, the third network element, the fourth network element, or the terminal device.

Further, a communication device 501 may further include a bus system. A processor 502, a memory 504, and a transceiver 503 may be connected through the bus system.

It is to be understood that the processor 502 may be a chip. For example, the processor 502 may be a field programmable gate array (FPGA), an application specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods can be implemented by using a hardware integrated logical circuit in the processor 502, or by using instructions in a form of software. The steps of the method disclosed with reference to embodiments of this application may be directly performed by a hardware processor, or may be performed by a combination of hardware and software modules in the processor 502. The software module may be located in a mature storage medium in the art, such as a random access memory, a flash memory, a read-only memory, a programmable read-only memory, an electrically erasable programmable memory, or a register. The storage medium is located in the memory 504, and the processor 502 reads information in the memory 504 and completes the steps in the foregoing methods in combination with hardware of the processor.

It should be noted that the processor 502 in embodiments of this application may be an integrated circuit chip, and has a signal processing capability. During implementation, the steps in the foregoing method embodiment may be implemented by using an integrated logic circuit of hardware in the processor or an instruction in the form of software. The processor may be a general purpose processor, a digital signal processor (DSP), an application specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory. The processor reads information in the memory and completes the steps of the methods in combination with hardware thereof.

The transceiver may be a transceiver unit, for example, including a receiving unit and a sending unit. The transceiver may also be a transceiver circuit or an interface circuit. The transceiver is for communication between the processor and an external network element or element.

It may be understood that, the memory 504 in embodiments of this application may be a volatile memory or a non-volatile memory, or may include both a volatile memory and a non-volatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. By way of example but not limitation, RAMs in many forms such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM) may be used. It should be noted that the memories in the systems and methods described herein are intended to include, but are not limited to, these memories and memories of any other suitable type.

In a case that the communication device 501 corresponds to the first network element in the foregoing method, the communication device may include the processor 502, the transceiver 503, and the memory 504. The memory 504 is configured to store instructions, and the processor 502 is configured to execute the instructions stored in the memory 504, to implement related solutions of the first network element in any one or more of corresponding methods shown in FIG. 2 to FIG. 4. Specifically, the transceiver 503 is configured to send a first request to a second network element, where the first request is for requesting authorization information of user-related data, the first request includes user information and a first use scope of the user-related data, and the first use scope includes at least one of the following information: a first use object, a first use purpose, and first use time; and receive a first response sent by the second network element, where the first response includes authorization information, and the authorization information indicates whether a user corresponding to the user information allows the user-related data to be used for the first use scope.

In a case that the communication device 501 is the first network element, the transceiver 503 is specifically configured to: receive a second request sent by a third network element, where the second request is for requesting the user-related data; and send the first request to the second network element based on the second request.

In a case that the communication device 501 is the first network element, the processor 502 is configured to obtain the first use scope from the third use scope based on the second request.

In a case that the communication device 501 is the first network element, the processor 502 is further configured to determine a first type identifier based on the second type identifier.

In a case that the communication device 501 is the first network element, the processor 502 is specifically configured to determine the first type identifier based on configuration information and the second data type identifier, and the configuration information indicates a correspondence between the first type identifier and the second type identifier.

In a case that the communication device 501 is the first network element, the processor 502 is specifically configured to determine a second data type identifier as the first type identifier.

In a case that the communication device 501 is the data obtaining network element, the transceiver 503 is further configured to send a second response to the third network element, and the second response includes user-related data requested by the third network element.

In a case that the communication device 501 is the first network element, when the authorization information indicates that the user corresponding to the user information allows the user-related data to be used for the first use scope, the processor 502 is specifically configured to obtain the user-related data.

In a case that the communication device 501 is the first network element, when the authorization information indicates that the user corresponding to the user information does not allow the user-related data to be used for the first use scope, the processor 502 is specifically configured to delete the user-related data or stop obtaining the user-related data.

In a case that the communication device 501 corresponds to the second network element in the foregoing method, the communication device may include the processor 502, the transceiver 503, and the memory 504. The memory 504 is configured to store instructions, and the processor 502 is configured to execute the instructions stored in the memory 504, to implement related solutions of the second network element in any one or more of corresponding methods shown in FIG. 2 to FIG. 4. The transceiver 503 is configured to receive a first request sent by a first network element. The first request is for requesting authorization information of user-related data, the first request includes user information and a first use scope of the user-related data, and the first use scope includes at least one of the following information: a first use object, a first use purpose, and first use time. The processor 502 is configured to determine the authorization information based on the first request; and send the first response to the first network element, where the first response includes the authorization information of the user-related data.

In a case that the communication device 501 corresponds to the second network element in the foregoing method, the processor 502 is specifically configured to determine the authorization information corresponding to the user information based on whether the first request matches stored authorization information of a network user.

In a case that the communication device 501 corresponds to the second network element in the foregoing method, the processor 502 is specifically configured to: initiate, by the second network element based on the first request, a third request to a terminal device corresponding to the user information, where the third request is for requesting, from the terminal device, the authorization information corresponding to the user information; and receive, by the second network element, a third response sent by the terminal device, where the third response includes the authorization information corresponding to the user information.

In a case that the communication device 501 corresponds to the second network element in the foregoing method, the processor 502 is specifically configured to: initiate, by the transceiver 503, a fourth request to a fourth network element based on the first request, where the fourth request is for requesting the authorization information corresponding to the user information from the fourth network element; and receive the fourth response sent by the fourth network element, where the fourth response includes the authorization information corresponding to the user information.

In a case that the communication device 501 corresponds to the third network element in the foregoing method, the communication device may include the processor 502, the transceiver 503, and the memory 504. The memory 504 is configured to store instructions, and the processor 502 is configured to execute the instructions stored in the memory 504, to implement related solutions of the third network element in any one or more of corresponding methods shown in FIG. 2 to FIG. 4. The transceiver 503 sends the second request to the first network element. The second request is for requesting to obtain user-related data, and includes user information and a third use scope. The third use scope includes at least one of the following information: a third use object, a third use purpose, and third use time. The transceiver 503 receives the second response sent by the first network element. The second response includes the user-related data or indication information, and the indication information indicates a failure in obtaining the user-related data.

In a case that the communication device 501 corresponds to the terminal device in the foregoing method, the communication device may include the processor 502, the transceiver 503, and the memory 504. The memory 504 is configured to store instructions, and the processor 502 is configured to execute the instructions stored in the memory 504, to implement related solutions of a data providing network element in any one or more of corresponding methods shown in FIG. 2 to FIG. 4. The transceiver 503 receives a third request sent by a second network element. The third request is for requesting authorization information of user-related data, the third request includes a first use scope of the user-related data, and the first use scope includes at least one of the following information: a first use object, a first use purpose, and first use time. The processor 502 determines the authorization information based on the third request, and sends the third response to the second network element through the transceiver 503. The third response includes the authorization information.

When the communication device 501 corresponds to the data providing network element in the foregoing method, the transceiver 503 is specifically configured to send a fifth request to a data management network element, where the fifth request is for requesting to obtain the authorization information of the user; and receive a fifth response from the data management network element, where the fifth response carries the authorization information of the user.

For concepts, explanations, detailed descriptions, and other steps of the communication device that are related to the technical solutions provided in embodiments of this application, refer to the descriptions of the content in the foregoing method or other embodiments. Details are not repeated herein again.

Figure 6:
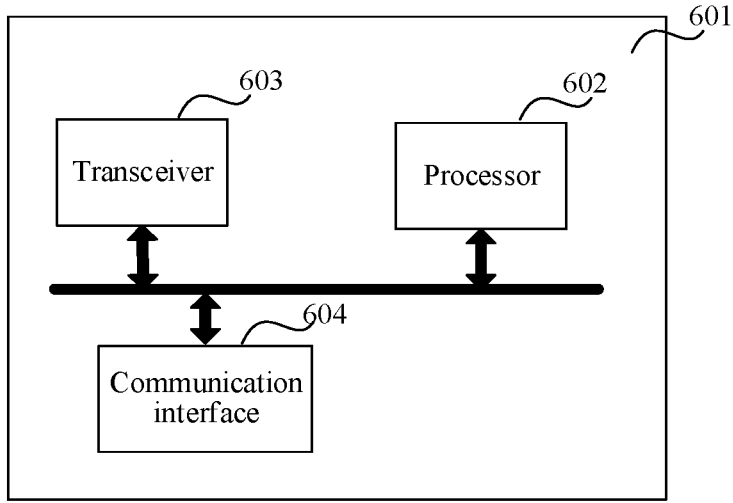
FIG. 6 is a schematic diagram of a structure of another communication device according to an embodiment of this application.

According to the foregoing method, FIG. 6 is a schematic diagram of a structure of a communication device according to an embodiment of this application. As shown in FIG. 6, a communication device 601 may include a communication interface 604, a processor 602, and a transceiver 603. The communication interface 604 is configured to input and/or output information; the processor 602 is configured to execute computer programs or instructions, so that the communication device 601 implements the method on a terminal device side in the related solutions from FIG. 2 to FIG. 4, or the communication device 601 implements the method on a network device side in the related solutions from FIG. 2 to FIG. 4. The network device side is, for example, any one or more of the first network element, the second network element, the third network element, the fourth network element, and the fifth network element. In embodiments of this application, the transceiver 603 may implement the solution implemented by the transceiver 503 in FIG. 5, and the processor 602 may implement the solution implemented by the processor 502 in FIG. 5. This is not repeated herein.

According to the method provided in embodiments of this application, an embodiment of this application further provides a communication system. The communication system includes the foregoing network device and one or more terminal devices. The network device is, for example, any one or more of the first network element, the second network element, the third network element, the fourth network element, and the fifth network element.

Figure 7:
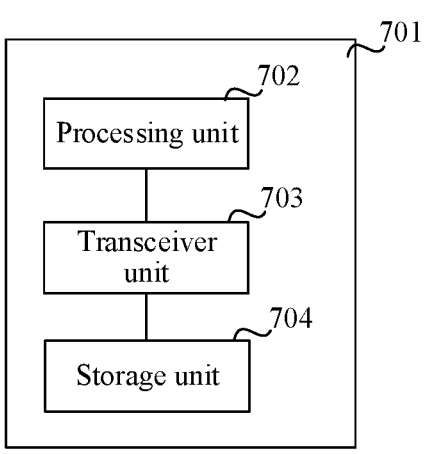
FIG. 7 is a schematic diagram of a structure of another communication device according to an embodiment of this application.

Based on the foregoing embodiments and a same concept, FIG. 7 is a schematic diagram of a communication device according to an embodiment of this application. As shown in FIG. 7, the communication device 701 may be a terminal device or a network device, or may be a chip or a circuit, such as a chip or a circuit that may be disposed in the terminal device or the network device.

In a case that the communication device 701 corresponds to the first network element in the foregoing method, the communication device may include a processing unit 702, a transceiver unit 703, and a storage unit 704. The storage unit 704 is configured to store instructions, and the processing unit 702 is configured to execute the instructions stored in the storage unit 704, to implement related solutions of the first network element in any one or more of corresponding methods shown in FIG. 2 to FIG. 4. The transceiver unit 703 is configured to send a first request to a second network element, where the first request is for requesting authorization information of user-related data, the first request includes user information and a first use scope of the user-related data, and the first use scope includes at least one of the following information: a first use object, a first use purpose, and first use time; and receive a first response sent by the second network element, where the first response includes authorization information, and the authorization information indicates whether a user corresponding to the user information allows the user-related data to be used for the first use scope.

In a case that the communication device 701 corresponds to the second network element in the foregoing method, the communication device may include a processing unit 702, a transceiver unit 703, and a storage unit 704. The storage unit 704 is configured to store instructions, and the processing unit 702 is configured to execute the instructions stored in the storage unit 704, to implement related solutions of the second network element in any one or more of corresponding methods shown in FIG. 2 to FIG. 4. The transceiver unit 703 receives a first request sent by a first network element, where the first request is for requesting authorization information of user-related data, the first request includes user information and a first use scope of the user-related data, and the first use scope includes at least one of the following information: a first use object, a first use purpose, and first use time. The processing unit 702 determines the authorization information based on the first request. The transceiver unit 703 sends a first response to the first network element, where the first response includes the authorization information, and the authorization information indicates whether a user corresponding to the user information allows the user-related data to be used for the first use scope.

In a case that the communication device 701 corresponds to the third network element in the foregoing method, the communication device may include a processing unit 702, a transceiver unit 703, and a storage unit 704. The storage unit 704 is configured to store instructions, and the processing unit 702 is configured to execute the instructions stored in the storage unit 704, to implement related solutions of the third network element in any one or more of corresponding methods shown in FIG. 2 to FIG. 4. The transceiver unit 703 sends a second request to a first network element. The second request is for requesting to obtain user-related data, and includes user information and a third use scope. The third use scope includes at least one of the following information: a third use object, a third use purpose, and third use time. The transceiver unit 703 receives a second response sent by the first network element. The second response includes the user-related data or indication information, and the indication information indicates that the user-related data fails to be obtained.

In a case that the communication device 701 corresponds to the terminal device in the foregoing method, the communication device may include a processing unit 702, a transceiver unit 703, and a storage unit 704. The storage unit 704 is configured to store instructions, and the processing unit 702 is configured to execute the instructions stored in the storage unit 704, to implement related solutions of the terminal device in any one or more of corresponding methods shown in FIG. 2 to FIG. 4. The transceiver unit 703 receives a third request sent by a second network element. The third request is for requesting authorization information of user-related data, the third request includes a first use scope of the user-related data, and the first use scope includes at least one of the following information: a first use object, a first use purpose, and first use time. The terminal device determines authorization information based on the third request, and sends a third response to the second network element. The third response includes the authorization information.

For concepts, explanations, detailed descriptions, and other steps of the communication device that are related to the technical solutions provided in embodiments of this application, refer to the descriptions of the content in the foregoing method or other embodiments. Details are not repeated herein again.

It may be understood that, for functions of the units in the communication device 701, refer to implementations of corresponding method embodiments. Details are not repeated herein again.

It is to be understood that division into the foregoing units of the communication device is merely logical function division. During actual implementation, all or a part of the units may be integrated into one physical entity, or may be physically separated. In embodiments of this application, the transceiver unit 703 may be implemented by the transceiver 503 in FIG. 5, and the processing unit 702 may be implemented by the processor 502 in FIG. 5.

According to the method provided in embodiments of this application, this application further provides a computer program product. The computer program product includes a computer program code. When the computer program code is run on a computer, the computer is enabled to perform the method in any one of the embodiments shown in FIG. 2 to FIG. 4.

According to the method provided in embodiments of this application, this application further provides a computer-readable storage medium. The computer-readable storage medium stores a program code. When the program code is run on a computer, the computer is enabled to perform the method according to any one of the embodiments shown in FIG. 2 to FIG. 4.

According to the method provided in embodiments of this application, this application further provides a system. The system includes the foregoing one or more terminal devices and the foregoing one or more network devices.

It should be noted that, a specific implementation of each module in this embodiment may be referred to the foregoing method embodiments, and details are not repeated herein in this embodiment.

It is to be understood that in this application, "at least one (item)" means one or more and "a plurality of" means two or more. The term "and/or" is used for describing an association relationship between associated objects, and represents that three relationships may exist. For example, "A and/or B" may represent the following three cases: only A exists, only B exists, and both A and B exist, where A and B may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

It should be noted that in this specification, relational terms such as first and second are only used to distinguish one entity or operation from another, and do not necessarily require or imply that any actual relationship or sequence exists between these entities or operations. Moreover, the terms "include" or any other variant thereof is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

In combination with embodiments disclosed in this specification, method or algorithm steps may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

Embodiments disclosed above are described to enable a person skilled in the art to implement or use this application. Various modifications made to embodiments will be obvious to a person skilled in the art, and the general principles defined herein may also be implemented in other embodiments without departing from the scope of this application. Therefore, this application is not intended to be limited to these embodiments illustrated herein, but shall be construed in the widest scope consistent with the principles and novel features disclosed herein.

What is claimed is:

1. A communication method, comprising:

receiving, by a network data analytics function network element, a second request from a third network element, wherein the second request is for requesting to obtain user-related data;

sending, by the network data analytics function network element, a first request to a unified data management network element based on the second request, wherein the first request is for requesting authorization information of the user-related data corresponding to an analytics identifier, wherein the first request comprises user information and a first use purpose for the user-related data, and wherein the analytics identifier identifies a type of analytics performed based on the user-related data; and receiving, by the network data analytics function network element, a first response from the unified data management network element, wherein the first response comprises the authorization information, and the authorization information indicates whether a user corresponding to the user information allows the user-related data to be used for the first use purpose.

2. The method according to claim 1, wherein the user-related data comprises one or more of first data or second data related to the user;

wherein the first data comprises data corresponding to the user generated by at least one of a terminal device, an application server, or a network device; and wherein the second data comprises a data analysis result obtained by performing data analysis based on the first data.

3. The method according to claim 2, wherein the first request further comprises a first type identifier, and the first type identifier is for identifying a type of the user-related data; and wherein the first request is for requesting authorization information of user-related data corresponding to the first type identifier.

4. The method according to claim 3, wherein the user-related data is the first data, the first type identifier is an event identifier, and the first data is data related to an event corresponding to the event identifier.

5. The method according to claim 1, wherein the second request comprises the user information and a third use purpose, wherein the method further comprises:

obtaining, by the network data analytics function network element, the first use purpose based on the third use purpose.

6. The method according to claim 1, wherein the second request comprises a second type identifier, and the second type identifier is for identifying a type of the user-related data requested by the third network element, wherein the method further comprises:

determining, by the network data analytics function network element, a first type identifier based on the second type identifier.

7. The method according to claim 6, wherein the determining, by the network data analytics function network element, the first type identifier based on the second type identifier comprises:

determining, by the network data analytics function network element, a second data type identifier as the first type identifier.

8. The method according to claim 6, wherein the determining, by the network data analytics function network element, the first type identifier based on the second type identifier comprises:

determining, by the network data analytics function network element, the first type identifier based on configuration information and a second data type identifier, wherein the configuration information indicates a correspondence between the first type identifier and the second data type identifier.

9. The method according to claim 1, wherein the third network element is an application function (AF) network element.

10. The method according to claim 1, wherein the first request further comprises at least one of a first user object or a first use time.

11. The method according to claim 1, wherein the first use purpose comprises data analytics or exposure to a third party application function.

12. A communication apparatus, comprising:

a memory, wherein the memory comprises computer-readable instructions; and a processor that communicates with the memory, wherein the processor is configured to execute the computer-readable instructions, to enable the communication apparatus to:

receive a second request from a third network element, wherein the second request is for requesting to obtain user-related data;

send a first request to a unified data management network element based on the second request, wherein the first request is for requesting authorization information of the user-related data corresponding to an analytics identifier, wherein the first request comprises user information and a first use purpose for the user-related data, and wherein the analytics identifier identifies a type of analytics performed based on the user-related data; and receive a first response from the unified data management network element, wherein the first response comprises the authorization information, and the authorization information indicates whether a user corresponding to the user information allows the user-related data to be used for the first use purpose.

13. The communication apparatus according to claim 12, wherein the first request further comprises at least one of a first user object or a first use time.

14. The communication apparatus according to claim 12, wherein the first use purpose comprises data analytics or exposure to a third party application function.

15. The communication apparatus according to claim 12, wherein the user-related data comprises one or more of first data or second data related to the user;

wherein the first data comprises data corresponding to the user generated by at least one of a terminal device, an application server, or a network device; and wherein the second data comprises a data analysis result obtained by performing data analysis based on the first data.

16. The communication apparatus according to claim 12, wherein the second request comprises the user information and a third use purpose, wherein the processor is further configured to execute the computer-readable instructions to enable the communication apparatus to:

obtain the first use purpose based on the third use purpose.

17. A communication system, comprising:

a network data analytics function network element; and a unified data management network element;

wherein the network data analytics function network element is configured to:

receive a second request from a third network element, wherein the second request is for requesting to obtain user-related data;

send a first request to the unified data management network element based on the second request, wherein the first request is for requesting authorization information of the user-related data corresponding to an analytics identifier, wherein the first request comprises user information and a first use purpose for the user-related data, and wherein the analytics identifier identifies a type of analytics performed based on the user-related data; and receive a first response from the unified data management network element, wherein the first response comprises the authorization information, and the authorization information indicates whether a user corresponding to the user information allows the user-related data to be used for the first use purpose; and wherein the unified data management network element is configured to receive the first request and send the first response.

18. The communication system according to claim 17, wherein the first use purpose comprises data analytics or exposure to a third party application function.

19. The communication system according to claim 17, wherein the second request comprises the user information and a third use purpose; and wherein the network data analytics function network element is further configured to obtain the first use purpose based on the third use purpose.

20. A communication method, comprising:

receiving, by a network data analytics function network element, a second request from a third network element, wherein the second request is for requesting to obtain user-related data;

sending, by the network data analytics function network element, a first request to a unified data management network element based on the second request, wherein the first request is for requesting authorization information of the user-related data corresponding to an analytics identifier, wherein the first request comprises user information and a first use purpose for the user-related data, and wherein the analytics identifier identifies a type of analytics performed based on the user-related data;

receiving, by the unified data management network element, the first request; and sending, by the unified data management network element to the network data analytics function network element based on the first request, a first response, wherein the first response comprises the authorization information, and the authorization information indicates whether a user corresponding to the user information allows the user-related data to be used for the first use purpose.

* * * * *